Feb. 14, 1967 B. J. GREENBLOTT ET AL 3,304,080

DOCUMENT SORTING APPARATUS

Filed Dec. 24, 1964 12 Sheets-Sheet 1

INVENTOR
BERNARD J. GREENBLOTT
DAVID R. McCORMICK
JOHN M. SCALONE
WENDELL J. WHEELER

BY K. P. Johnson
ATTORNEY

Feb. 14, 1967 B. J. GREENBLOTT ET AL 3,304,080

DOCUMENT SORTING APPARATUS

Filed Dec. 24, 1964 12 Sheets-Sheet 4

Feb. 14, 1967 B. J. GREENBLOTT ET AL 3,304,080

DOCUMENT SORTING APPARATUS

Filed Dec. 24, 1964 12 Sheets-Sheet 5

Feb. 14, 1967 B. J. GREENBLOTT ET AL 3,304,080

DOCUMENT SORTING APPARATUS

Filed Dec. 24, 1964 12 Sheets-Sheet 8

United States Patent Office 3,304,080
Patented Feb. 14, 1967

3,304,080

DOCUMENT SORTING APPARATUS

Bernard J. Greenblott, Pleasantville, N.Y., David R. McCormick, Westwood, N.J., and John M. Scalone, Vestal, and Wendell J. Wheeler, Endwell, N.Y., assignors to International Business Machines Corporation, New York, N.Y., a corporation of New York Filed Dec. 24, 1964, Ser. No. 420,986
15 Claims. (Cl. 271—3)

This invention relates generally to document sorting apparatus and more particularly to apparatus with which randomly organized documents, each having a value coded thereon, may be sorted into a single ordered sequence without operator intervention.

A method of sorting documents having randomly arranged sequences into a single sequence of ascending or descending order according to the numerical or alphabetical information punched or imprinted thereon is commonly known as sorting by collating or sorting by merging. Machines have heretofore been devised for accomplishing this function automatically. In such machines, stacks of record documents are initially placed in one or more magazines and fed singly therefrom. Each successive document is sensed for its recorded value and this value is compared with a document in another magazine and with a preceding document. Assuming that the documents are to be arranged in a single ascending order, when the value of a following document is found to be greater than that of the preceding document it is fed into a document receiver holding the preceding document. The value of the following document is then stored for comparison with the next card fed from a magazine. When a following document from each magazine is compared with the last document in the receiver and all found to be less in value than the preceding document, the lowest of these documents is diverted to a different receiver so that a new sequence can be started. Subsequently processed documents will continue to be fed into the second receiver until another break in sequence occurs or until all compared documents are again of lower value than the receiver document at which time a new sequence is started in the first receiver. It will be noted that documents may be placed in a reverse or descending order merely upon controlling the machine to start the new sequence in a receiver when a document is found having a value higher than the preceding record.

Upon further consideration of this mode of operation, it will be seen that after all documents initially placed in the magazine have been read, compared and deposited in the receivers, the number of sequences originally present in the randomly ordered documents will be decreased to some smaller number of sequences. After completion of the first pass of documents, they are subjected to repeated passes to subsequent receiving stations or recirculated through the original magazines to further decrease the number of sequences. This process continues until a single ordered sequence of documents is obtained.

The known machines, however, have inherent disadvantages which make them large, cumbersome and limited in speed of operation. In some machines only a single digit of the card value is sensed during each pass, thus requiring an extensive number of passes and stages for sorting a stack of documents. This type of machine becomes expensive and the operation is time-consuming when a large number of documents, each having a multi-digit value coded thereon, are to be sorted into a single ordered sequence. Still other machines provide continuous recirculation of the documents until the single sequence is achieved. These machines are generally constructed with the conventional document feeding and moving devices such as feed knives and feed rollers which are necessarily slow for individual activation with each processed card. The closed loop arrangement, as is known, also requires a large amount of floor space since the documents are transported generally in a plane parallel to the floor, and often only a single document is moving at one time so that the operation is somewhat inefficient.

Accordingly, it is one of the primary objects of this invention to provide apparatus for sorting documents by merging which is capable of sorting fields of numeric or alphabetic data automatically with improved efficiency and operating speed.

Another primary object of this invention is to provide sorting apparatus which sorts documents by merging the documents according to their sequential value and moves a plurality of documents coincidentally.

A further object of this invention is to provide reversible sorting apparatus which is operable to deposit documents in descending or ascending sequential order in any of one plurality of magazines from any of another plurality of magazines.

Another object of this invention is to provide document sorting apparatus having low inertia transport mechanisms having improved response time when energized.

Yet another object of this invention is to provide transport members for a document sorter using vacuum attraction for holding documents to the transport members during movement.

A still further object of this invention is to provide a plurality of groups of transport devices for a sorting machine with each group associated with a common transfer device in which a document is moved among the transport and transfer devices in substantially a single plane.

A still further object of this invention is to provide improved switching apparatus for vacuum chambers in a document transporting and sorting machine.

In accordance with the foregoing objects the invention provides a pair of groups of document magazines with each magazine being adapted to hold a stack of documents therein and each magazine being provided with an individual document transport means operable in opposite directions to either remove documents from its respective magazine to a transfer point or enter a document thereinto from a transfer point. Intermediate the two groups of magazines and transport means is located a transfer means capable of receiving a document from any one of the transport means in one group and carrying the document to any one of the remaining transport means in the other group. The transport means and transfer means are each comprised of perforated endless belts which have a document attracted thereto by vacuum during movement of a document therewith. Means are provided to operate any of the transport or transfer means in either direction as desired, and vacuum control means are selectively operable to provide vacuum only at positions where a document is present on the belts.

In operation, each of the transport means in one plurality are controlled to remove a document from its respective magazine and carry the document past a sensing station where the desired information on the document is read and then transferred into a memory unit for comparison. Control means for the transport and transfer means are then selectively operated to actuate one of the transport means to move the document having the lowest value to the transfer means. When the lowest valued document is selected, a new document is withdrawn from the magazine adjacent that transport means and read so that a full plurality of documents is ready for comparison. After the lowest valued document has been moved to the transfer means, the control means therefor indexes the transfer means to carry the document into alignment with one of the transport means of the second plurality. Upon the next comparison cycle, one of the transport means in the first plurality is actuated to again deliver its document to the transfer means, and at the same time one of the transport means in the second plurality is actuated to carry the first-selected document into its magazine. In this manner one document is moved into the transfer means and another out of the transfer means concurrently so as to enable overlap of operation and thus avoid waiting until one document has been moved to its destination.

The withdrawal and sensing of documents in each of the magazines of the first plurality continues until these magazines have been emptied. Each document is compared with each of the documents already in the other transport means, read and deposited within a selected one of the magazines of the second plurality as long as there is a document available which is greater in value than the last document already deposited in the selected magazine. As soon as a break in sequence occurs, in which all documents compared in the first plurality are lower than the last document deposited, a new magazine in the second plurality is selected and the comparing process is repeated and continued until another break in sequence is detected. This mode of sorting continues with each break in sequence causing the selection of a new magazine in the second plurality until each magazine has received a sequence of documents therein; at that time the next sequence is started in the first of the magazines of that plurality. It can be seen that the invention thus provides apparatus by which a plurality of cards can be compared nearly simultaneously and deposited in a magazine in sequential order until a new sequence is detected. Because of the comparison of a plurality of cards, the randomly ordered cards in the magazines of the first plurality can be re-ordered into pluralities having fewer sequences. After all documents have been withdrawn from the magazines of the first plurality and deposited into those of the second plurality, the sorting operation is reversed automatically without operator intervention. At this time, each of the transport means of the second plurality withdraw a document from their respective magazines and the highest-valued document is selected from the plurality and deposited into a magazine in the first plurality. The reverse process of selecting the highest-valued card and then successively lower valued cards permits the documents to be sorted into still fewer sequences when moving in the direction from the second plurality back to the first plurality of magazines. With each such pass of the documents between the pluralities of magazines, the number of sequences becomes smaller and eventually only a single sequence results. At this time the apparatus may be controlled to automatically terminate its operation.

The foregoing and other objects, features and advantages of the invention will be apparent from the following more particular description of a preferred embodiment of the invention, as illustrated in the accompanying drawings wherein.

Figure 4:
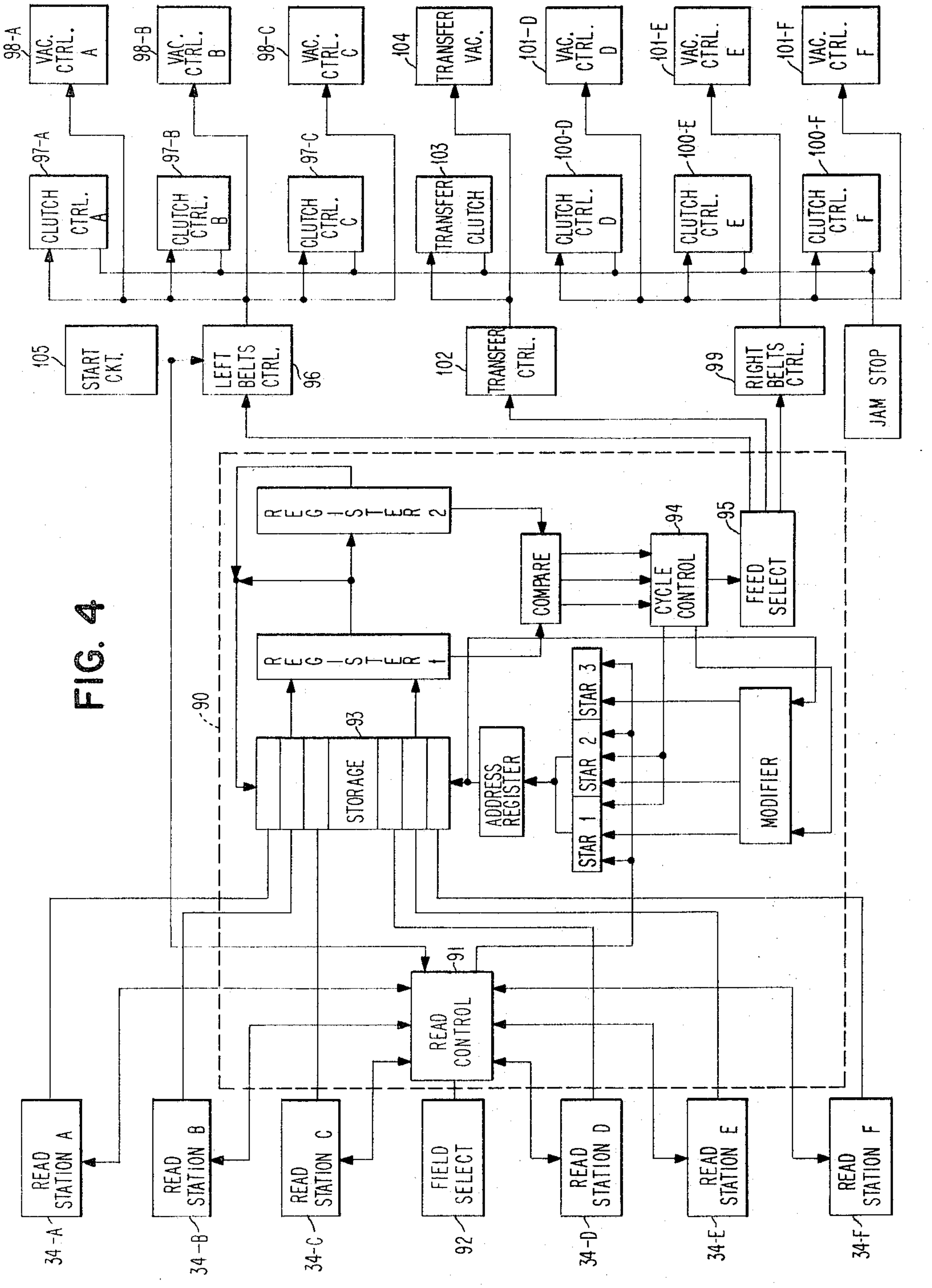
FIGURE 4 is a schematic block diagram of the control circuits used in the sorting apparatus.
Figure 6:
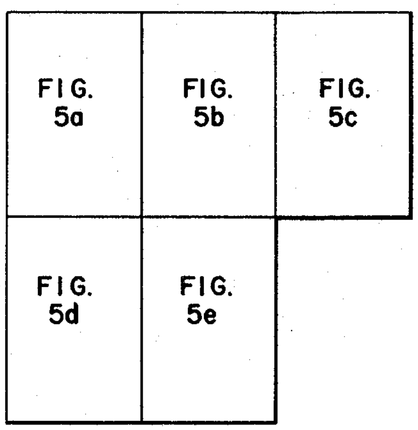
Figure 7:
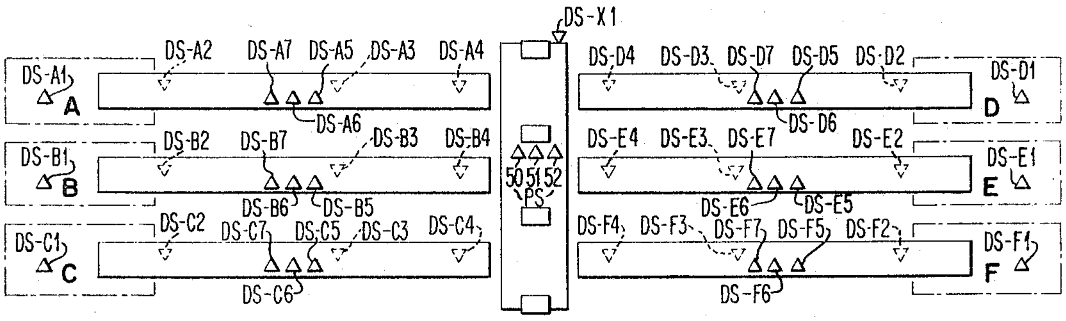
Figure 8:
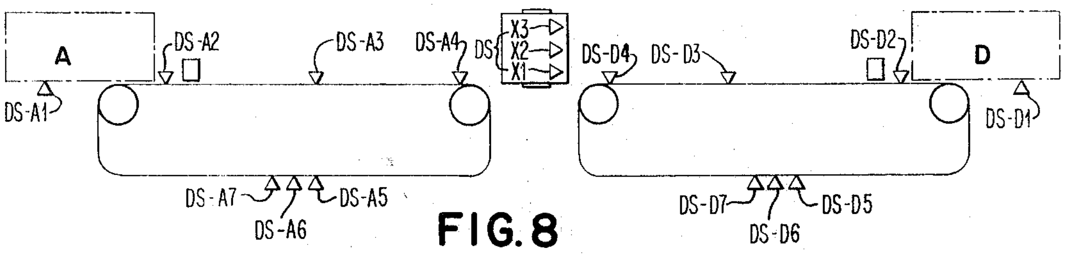
Figure 10:
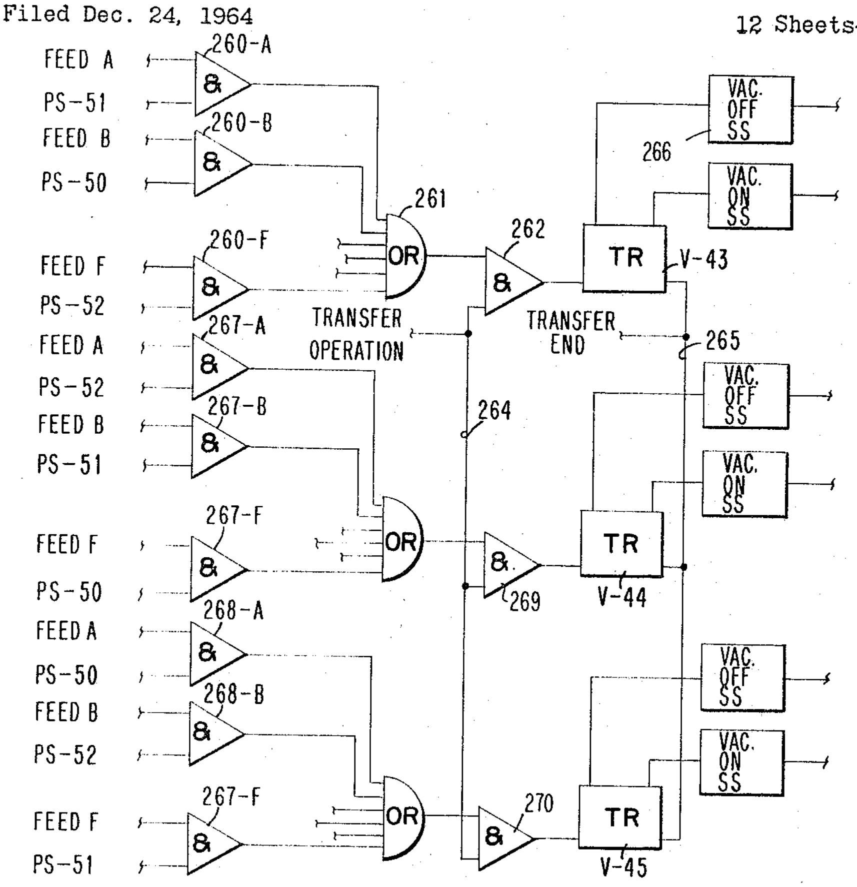

FIGURES *5a* through *5e* are detailed diagrams of the circuits shown in FIG. 4;

FIGURE 6 is a diagram showing the arrangement of FIGS. *5a–5e*;

FIGURES 7 and 8 are diagrammatic views of the sorting apparatus showing the location of photoresponsive sensors used in conjunction therewith;

FIGURES *9a* and *9b* are diagrams of the electrical control circuits and corresponding vacuum chambers controlled thereby for the document transport belts for the sorting apparatus;

FIGURE 10 is a circuit diagram for controlling the vacuum chambers for the transfer belt in the sorting apparatus; and FIGURES *11a–11c* are schematic diagrams of the possible arrangements of perforations in the transfer belt which can occur during sorting.

Figure 1:
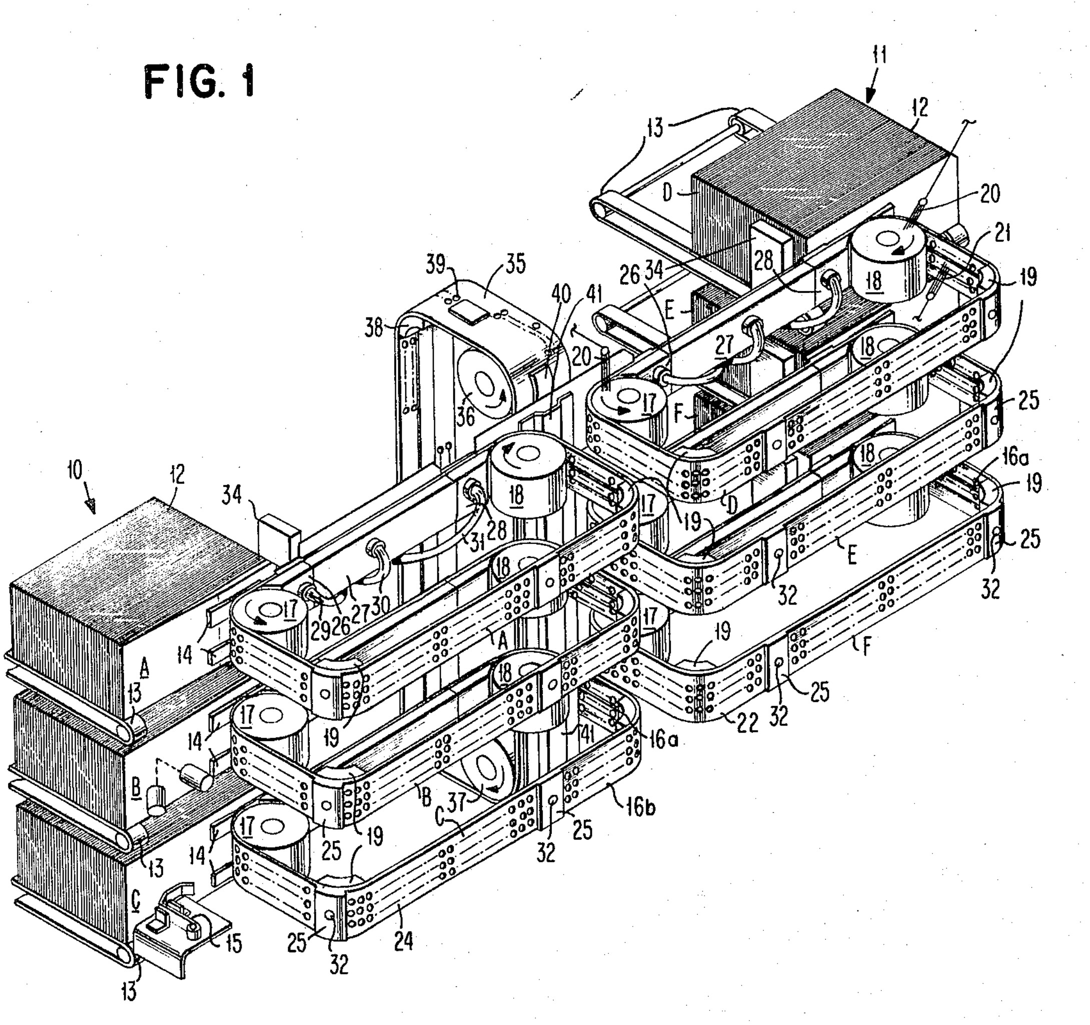
FIGURE 1 is a perspective view of the sorting apparatus of the invention.

Referring to FIG. 1, the sorting apparatus of the invention comprises generally a first plurality of magazines 10 including magazines A, B and C, and a second plurality of magazines 11 including magazines D, E and F. Each magazine is adapted to hold a stack of documents 12 therein which may be supported on a pair of movable belts 13 or other suitable structure such as an inclined bedplate. The magazines are constructed to maintain documents lightly against their respective stationary support fingers 14 so that the documents may be successively withdrawn from or deposited in the stack without binding or jamming. If desired, suitable pressure sensitive switches 15 may be positioned so as to actuate a motor to vary the position of belts 13 in a particular magazine.

Adjacent each magazine is a transport means operable in either a forward or reverse direction to withdraw documents from or deposit documents in the magazine. The arrangement of a magazine and corresponding transport apparatus is shown and described in U.S. Patent 3,140,089, issued August 7, 1964, to B. J. Greenblott and W. J. Wheeler. The transport means, however, will be briefly described here. Each transport means comprises an endless flexible belt 16 each of which may be more specifically identified by a letter A–F. The belts are made of electrically conductive material such as steel covered on its outer surface with a high friction material 22 such as rubber or polyethylene. Each belt is supported for rotation in either a forward or reverse direction on a pair of counter-rotating clutches 17 and 18 and a pair of stationary guides 19. Clutches 17 rotate continuously in a counterclockwise direction and clutches 18 rotate continuously in the clockwise direction as shown in the figure. All clutches are electstatic clutches powered by a common source (not shown) through suitable coupling, although individually powered clutches may be used. The belt is moved in the selected direction by energizing the appropriate clutch with an electrical drive signal which, in turn, attracts the belt to the clutch surface for movement therewith. The belt is stopped by applying a short brake pulse to the oppositely rotating clutch immediately upon termination of the drive signal. Electrical signals are applied to the clutches and belts by a brush 20 in contact with the clutch and a brush 21 in contact with the belt on that particular clutch (shown only for belt D).

Each belt is formed with recesses 24 on its outer surface and the recesses are separated by raised divider portions 25. The belts and recesses are shown in detail in the aforementioned patent. Each recess is co-extensive with the length of the document 12 to define a document-receiving pocket and the recesses are spaced uniformly about the belt periphery. Each recessed portion is perforated and holds a document therein by vacuum applied from chambers 26, 27 and 28 over which the belt passes. The chambers are evacuated via respective ducts 29, 30 and 31 which connect to a vacuum source (not shown) through a valve arrangement shown in FIG. 3 to be described subsequently. When a belt is to be moved, the chambers are evacuated and the vacuum is maintained therein when a document is present opposite the chambers.

Each horizontal transport means is identical in structure and the immediately foregoing description pertains to the transport apparatus for each of the magazines A–F. Although not shown, there are provided suitable fixed guide surfaces for the belts and documents moved thereby to prevent transverse vertical displacement during belt operation. A suitable arrangement of guides is disclosed in the above-mentioned Patent 3,140,089.

A reading station 34 is provided adjacent each horizontal belt with which information is read from the document. The reading stations are located next to their respective magazines and are operative to scan a document as it is removed from the magazine by the belt. Reading may be accomplished by any suitable means such as photoelectric cells or magnetic heads, and the information sensed is transferred to storage apparatus such as a computer memory.

Intermediate the two magazine pluralities 10 and 11 and their transport means, there is provided a transfer means by which documents may be moved from one transport means to another during a sorting operation. The transfer means generally comprises a belt 35 which is supported on counter-rotating electrostatic clutches 36 and 37 and stationary guide members 38. This belt is somewhat similar to a transport belt in that it is provided with perforations 39 and raised portions 40 which serve to define document-receiving pockets. The clutches for belt 35 are so controlled that a recessed portion is in alignment with each of the belts 16. This enables a document 12 to be moved horizontally between the raised portions 40 of belt 35 from any one of the horizontal transport belts. Fixed guide 41 is provided intermediate the two pluralities of transport belts and adjacent the transfer belt 35 to guide the leading edge of a document into position on the transfer belt from either horizontal direction.

Figure 2:
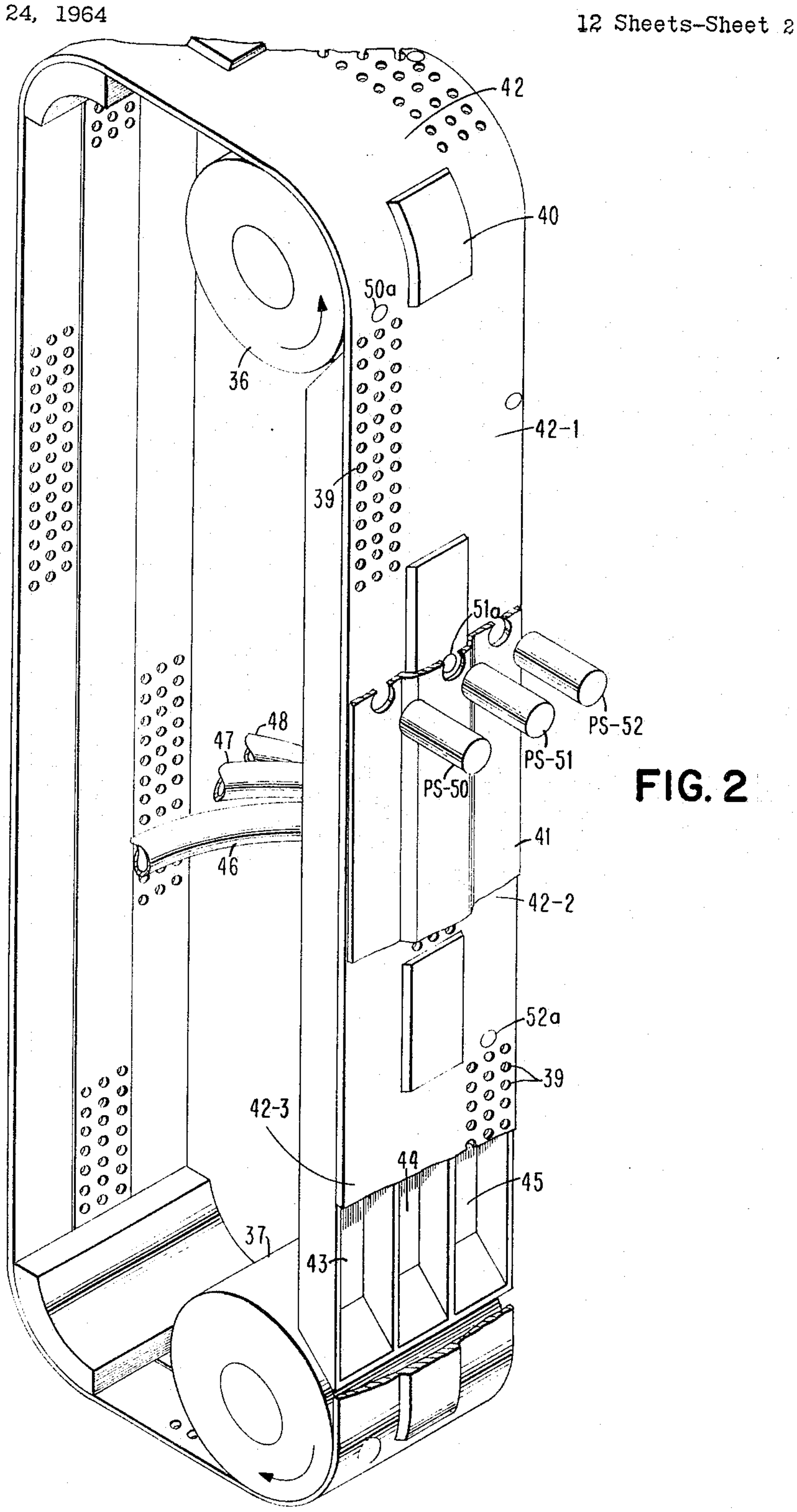
FIGURE 2 is a perspective view of the document transfer belt as used in the sorting apparatus.

The transfer means including belt 35 is more clearly illustrated in FIG. 2. The belt is provided with pluralities of holes 39 at each document-receiving pocket 42 between the raised belt portions 41. The vacuum chambers 43, 44 and 45 under the forward surface of the belt, extend between electrostatic clutches 36 and 37 and are connected to a suitable source of vacuum via respective ducts 46, 47 and 48. The chambers are each of the same size and, when operated, provide the vacuum for one-third of the belt width co-extensive with belt span between oppositely rotating clutches. Belt 35 and its guide 41 are sufficiently long between the two clutches so as to provide document receiving pocket 42 in alignment with each pair of horizontal belts 16 (FIG. 1). In the embodiment illustrated, three pockets 42 are provided between the clutches and these pockets are adapted to receive the document from either direction, for example, from either magazine and belt A or magazine and belt D. It will be noted that each of the three pockets is perforated at a different location. For example, pocket 42–1 is provided with perforations in alignment with vacuum chamber 43, the perforations of pocket 42–2 are aligned with vacuum chamber 44, and the perforations of pocket 42–3 are aligned with vacuum chamber 45. As can be seen in the figure, this pattern of perforations is repeated for each three receiving recesses 42. A document may thus be moved into recess 42–1 and transfer electrostatic clutch 37 then energized for a period of time sufficient to move pocket 42–1 down to the position currently occupied by recess 42–2 or 42–3, into alignment with any one of the horizontal transport belts shown in FIG. 1. During this motion, there need be evacuated only one of the chambers 43–45 since the chambers extend throughout full vertical distance through which a document is required to be moved.

The position in which transfer belt 35 stops is determined by means of photosensors PS–50, 51 and 52 detecting reflective spots 50*a*, 51*a* and 52*a*, respectively, which may be merely white marks provided on the surface of the transfer belt. It will be noted from the figure that the reflective spot 50*a* occurs only upon that portion of the belt in which the perforations are provided in alignment with vacuum chamber 43. Similarly, reflective spots 51*a* and 52*a* occur only for perforations in alignment with chambers 44 and 45, respectively. Thus, as the transfer belt is incremented in either direction by clutches 36 or 37, the signals of sensors PS–50, 51 and 52 can be checked to determine which of the three vacuum chambers is to be evacuated when one of the three horizontal transport belts deposits a document in a receiving pocket of belt 35. In the drawing, PS–51 senses reflective spot 51*a* so that if a document is moved into recess 42–1 of the belt, vacuum chamber 43 can be evacuated. It will be noted that when a reflective spot 52*a* is in alignment with sensor PS–52, then vacuum chamber 44 will have to be evacuated to hold a document in the uppermost recess of the transfer belt. The control of clutches 36 and 37 and the evacuation of chambers 43, 44 and 45 will be described hereinafter in conjunction with the control circuits for the sorting apparatus.

Figure 3:
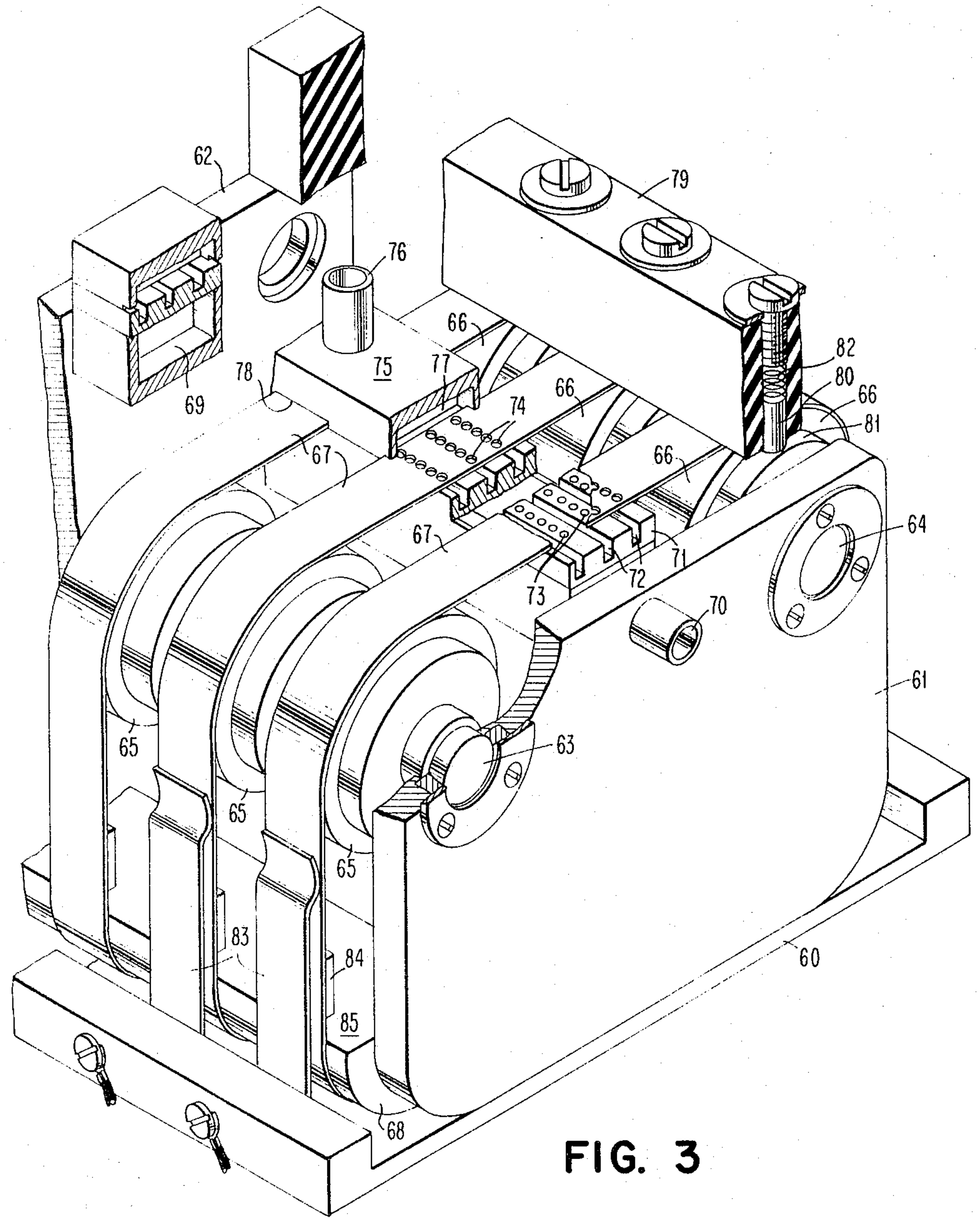
FIGURE 3 is a perspective view of the high speed valve mechanism used to control the evacuation of vacuum chambers along document paths.

In FIG. 3, there is shown a high speed control valve mechanism for controlling the evacuation of chambers 26, 27 and 28 for the transport belts 16–A through 16–F, and the chambers 43, 44 and 45 for transfer belt 35. In the sorting apparatus as shown, there are twenty-one vacuum chambers to be evacuated or raised to atmospheric pressure by the control valve mechanism. The valves comprise a base 60 on which is mounted a pair of side plates 61, 62. Journaled in the side plates are a pair of shafts 63, 64 on each of which is fixed a plurality of electrostatic clutch rotors 65, 66, respectively. Each rotor on one shaft is in alignment with a rotor on the other shaft and an electrically conductive endless band 67 is supported on the rotors and stationary guides 68. A pair of rotors and a band are provided for each vacuum chamber to be controlled.

Intermediate the shafts and adjacent the lower surface of the belts is a compartment 69 which is evacuated through duct 70 that is connected to a suitable source of vacuum (not shown). Top plate 71 of compartment 69 is formed with longitudinal grooves 72 co-extensive with the length of the compartment. Pluralities of perforations 73 are formed in the top surface through which air is drawn to create the vacuum thereabove. Each band 67 is provided with corresponding pluralities of perforations 74 that can be positioned in alignment with perforations 73. Above each belt is a hood 75 which is secured to the walls of the compartment 69. One hood is provided for each vacuum chamber and has a duct 76 fixed thereto for connection with suitable tubing to join a vacuum chamber with its respective hood. The hoods are interconnected only by channels 72 which are common to all bands. The hoods may be a single unit, however, with partitions 77 adjacent both sides of each band so that vacuum in a duct 76 is controlled only by its respective band. The clearance between a band 67 and its hood at junction 78 is kept to a minimum to reduce air leakage.

There are mounted on the two side plates 61, 62 a pair of electrically non-conductive blocks 79 in which brushes 80 are supported. Each brush 80 rides in contact with the rotating shoulder 81 of its respective clutch rotor 65 or 66 and is held in position by a suitable screw and spring assembly 82 inserted in blocks 79. One side of the operating circuit (not shown) is connected to the screw, and the opposite side of the circuit is connected to one of the band tension straps 83. The straps are secured to base 60 and spring-biased against the corresponding bands 67 to maintain tension on the band.

The valve apparatus is operated by selectively energizing one of the two oppositely rotating clutch rotors under the desired band. When the control circuit is closed between the brush 80 and corresponding tension strap 83, the band adheres to the clutch rotor surface and moves therewith until the circuit is opened or the oppositely rotating clutch rotor is energized. However, because of the small mass and quick response, each band is provided with stops 84 fixed thereto and arranged to contact a fixed surface such as surface 85 of guides 68. The band movement can thus be controlled to align holes 74 therein with either holes 73 or channels 72 to respectively provide vacuum or atmospheric pressure in ducts 76.

Document sorting is accomplished by using one of the two pluralities of magazines 10, 11 in FIG. 1 as supply magazines and the other plurality as receiving magazines. For example, magazines A, B and C may initially be filled with randomly arranged documents to be sorted, while magazines D, E and F are designated receiving magazines, and initially empty. Either magazine plurality can be chosen as the supply plurality initially. Upon commencing sorting, a document is withdrawn from each of the three supply magazines A–C and moved through the reading stations 34 of the respective transport means so that the fields of sorting data on the documents are scanned and the data transmitted to storage and comparing apparatus. The sensed data for the three documents are compared and the document having the lowest value is selected and sent to the designated receiver magazine. The transport means for the selected document is activated and the document is carried to the transfer means, being deposited in one of the pockets therein. At the same time that the transport means is activated, another document is carried from its supply magazine and read for subsequent comparison with the remaining two documents which were not selected.

After the selected document reaches the transfer means, the transfer means is activated for an increment of movement either up or down 1 or 2 increments or rendered inoperable as necessary for the selected document to be placed in alignment with the transport means of the designated receiving or stacking magazine. After the transfer means has been positioned in alignment with the appropriate receiver transport means, no further document or belt movement occurs until the next comparison. At that time the second selected document is moved into a transfer belt recess while the first selected document is moved out of the transfer belt recess by one of the receiver transport means.

The control circuits for the sorting apparatus are shown by means of the block diagram in FIG. 4, to illustrate the relationship of the major control lines required. It will be noted that the sorter is shown in conjunction with a general purpose digital computer which is used to handle the data storage, comparing functions, and selection of transport belts required in a sorting application. The sorting apparatus, however, may be equipped with its own storage, comparing and selection units, if desired.

Reading stations 34–A throuh 34–F are conditioned by signals from Read Control unit 91 which receives operating signals from computer 90 that may be any suitable general purpose digital computer having storage and comparing functions. The Read Control unit may further be conditioned by signals from an optional Field Select circuit 92 for defining groups of document columns to be read and stored. Information read by any reading stations is sent to predetermined locations in Storage unit 93 of the computer.

The computer, through a Cycle Control unit 94 and a Feed Selector 95, signals a selection of transport belts to be moved and the direction of movement of the belts after the first document in each magazine has been read. Belts 16–A, 16–B and 16–C for their respective magazines are selected by signals to Left Belts Control 96 and the particularly desired Clutch Control 97 such as A, B and C with corresponding Vacuum Control 98. When a feed belt has been selected for movement, a stacking belt is selected through Right Belts Control 99 and the desired Clutch Control 100 such as D, E or F and the corresponding Vacuum Control 101. When a document has been moved into the recess in the transfer belt and is to be carried either up or down, then Transfer Belt Control 102 is activated to, in turn, control the Transfer Clutch Control 103 and the corresponding Vacuum Control 104. Start Circuit 105 is provided and connected to Feed Belt Control 96 and Read Control unit 91 in order to withdraw a document from each of the three left magazines for the initial comparison.

In starting a sorting operation only the belts for the supply magazines are operated to provide a plurality of documents for comparison. When a comparison and selection is complete, one of these belts is energized for a time sufficient to carry the card into a pocket in transfer belt 35 (FIG. 1). The transfer belt is then energized to carry the selected document into alignment with the receiver magazine belt which is selected by the computer. When the first selected document is deposited in the transfer belt, a replacement document is withdrawn from the supply magazine and read so that its contents were placed into computer storage. The next comparison step of the two unselected cards and the new replacement card occurs while the transfer belt is accomplishing whatever movement is required carrying the first selected card into alignment with a receiver belt. At the conclusion of receiver belt motion, if any, the selection of the next card from the supply belts is made and one of the belts is activated to deposit the selected card in a transfer belt recess. However, simultaneously with this selection one of the receiver magazine belts is also energized to carry the first selected document from the transfer belt to a temporary stopping point midway between the two clutches for the receiver belt. A simultaneous operation of a supply and a receiver belt thus permits a document, newly deposited in the transfer belt, to be moved to the required level for alignment with a receiver belt. The removal of a document from the transfer belt by a receiver belt is considered by the sorting apparatus and computer to have been deposited in one of the receivers even though the document has not yet reached the selected receiver. However, when the receiver belt holding the document is again operated the original document therein will be moved into the receiver magazine.

The control circuits for the transport and transfer belt clutches are shown in more detail in FIGS. *5a* through *5e* arranged in accordance with FIG. 6. In the following description the upper and lower of two voltage levels indicate the respective presence and absence of an electrical signal. The selection is purely arbitrary and may be changed, as desired, in machine construction. A circuit is shown as an arrangement of logic circuits such as OR, AND, Trigger, Latch, Inverter, and Single Shot circuits, all commonly known so that their construction need not be described in detail. The function of each circuit, however, will be briefly described.

An OR circuit, indicated by a semicircle with an "OR" therein, is a circuit having multiple input terminals and a single output terminal such that a signal on one or more of the inputs will produce a signal at the output terminal.

An AND circuit, indicated by a triangle with an "&" therein, indicates a circuit having two or more input terminals and a single output terminal internally connected together such that all input terminals must have signals thereon concurrently before an output signal is produced.

A Trigger, indicated by a box with a "TR" therein, constitutes a bistable flip-flop circuit having a pair of input terminals and a pair of output terminals, although only one output is shown if there is no need for the second output. The input terminals are on opposite sides of the box near the bottom and the output terminals are at the top of the box. A signal at the lower left input terminal turns the trigger on so that an output signal is present only at the right top output terminal. A signal at the lower right input terminal turns the trigger off so that a signal appears at the top left output terminal and no signal is present at the other output terminal. The triggers use a self-gating signal at the input terminals from the opposite output terminal, and the input terminals are capacitively coupled to the triggers so that only a rising change in voltage produces a change in the trigger condition.

A Latch, so designated, has an input or "Set" terminal at the left side thereof and a "Reset" terminal at the bottom thereof with an output terminal shown at the right side. The latch is turned on by a D.C. signal at the Set terminal and is turned off by a D.C. signal at the Reset terminal. An output signal exists when the latch is turned on.

An Inverter circuit, indicated by a box having an "I" therein, is a circuit having a single input at the left side thereof and a single output at the right side. This circuit is used to reverse the polarity or signal level to the opposite state from that which is present at the input side. Thus a signal present at the input will be indicated as no signal at the output and vice versa.

A Single Shot, indicated by a box with "SS" therein, is a circuit having a single input and a single output and is constructed such that when a signal is applied to the input an output signal will be produced for a predetermined fixed time and then will automatically terminate.

In order to closely control the movement of documents in the apparatus, the presence of documents is monitored by document sensors at selected locations. The sensors shown are well-known photo-responsive devices but may be any suitable detector such as switch levers or ultrasonic sensors. Each magazine, transport and transfer belt is provided with a plurality of sensors with the locations schematically illustrated in FIGS. 7 and 8. The sensors respond with a signal on sensing a document or reflective spot on a belt, and in the description are referenced by magazine and belt letter such as A or B and a number suffix. For example, the presence of documents is detected in magazine A by document sensor DS–A1. The removal of a document from that magazine is detected by DS–A2 and the presence of the document in the compare station is detected by DS–A3. Sensors DS–A4 and DS–D4 together indicate a document positioned on the transfer belt 35. Sensors DS–A5 through A7 are used to control belt motion by the detection of reflective spots on the belt corresponding to each document recess. Sensors DS–X1, X2 and X3 similarly detect and signal transfer belt increments by means of uniformly positioned reflector spots on the belt.

The sorting operation is initiated by producing a signal with Start switch 110 in FIG. *5d* at AND circuit 111 which is conditioned by a Ready signal from the computer. The Start signal is supplied to AND circuits 112–A, 112–B and 112–C, each of which is conditioned by a signal from their respective sensors DS–A1, B1 and C1 each indicating the presence of documents. Each of the latter AND circuits provides an output signal for its respective transport clutch 18 (FIG. 1). In starting the sorting operation documents are stacked in each of the three magazines A, B and C in order to provide maximum number of documents for comparison.

At this time it is only necessary that a document be withdrawn from each magazine on the left plurality and transported past reading station 34 (FIG. 1) so that information may be read from the documents to their respective storage locations in the computer. Each of the clutches for these three transport belts on this control feed in the forward direction and the belt is to be moved one increment of distance which corresponds approximately to the length of the document withdrawn plus the divider length. The circuit for feeding each of the three transport belts is identical and only that for transport belt A is shown. The signal from AND circuit 112–A is passed by OR circuit 113–A turning on Drive trigger 114–A. The on output from the trigger is supplied to a suitable Delay circuit 109–A to AND circuits 115 and 116. The purpose of the delay is to permit evacuation of chamber 26 (FIG. 1) prior to belt movement. AND 115 is gated by a Forward signal from Direction trigger 117, initially reset on at the start of a sorting operation. The Direction trigger determines the belt clutches which receive accelerate and brake signals and thus the direction of motion of documents from one plurality of magazines to the other. In a forward mode, documents move from left to right in FIG. 1. Since trigger 117 is in the on condition, a Forward signal conditions AND 115 so that a signal is provided therefrom to OR circuit 118 to the clockwise clutch for belt A. The resultant rotation of the clutch and belt withdraw a document from magazine A and carry the document past the reading station so the information is transmitted to storage. In order to control the columnar reading, timing marks, spaced at distances equivalent data columns, are preferably provided on either the belt or document for synchronization of data pulses.

The document is stopped at the comparing station by providing a short brake signal to the oppositely rotating clutch, and the generation of this signal is controlled by the detection of reflective marks 32 (FIG. 1) on the belt periphery at sensors DS–A5, A6 and A7. Sensor DS–A7 operates similar to sensor DS–A5 except in the reverse direction of the belt. With reference to FIG. 8, it will be seen that as belt A moves in the clockwise direction a reflective spot on the belt periphery will be sensed first by DS–A5 and then subsequently by DS–A6. The reflective spot 32 is provided on the belt for each increment of distance equivalent to a document length plus the length of raised divider portion between documents. Referring again to FIG. *5d*, the Brake signal is generated by turning off Drive trigger 114–A. This trigger is turned off when DS–A5 generates a signal by detecting a reflective spot and applies the signal at AND circuit 119–A which is conditioned by the Forward signal from trigger 117. When trigger 114–A goes off it provides a signal to turn on Brake trigger 120–A. The on signal from the latter trigger is supplied to AND circuits 121 and 122. AND circuit 122 is conditioned by the Forward signal and thus provides an output through OR circuit 123 to counterclockwise clutch A to stop belt A. The Brake trigger 120–A is turned off when the sensor DS–A6 detects a reflective spot after it had been detected by DS–A5.

At this time it will be seen that a document has been removed from the magazine A and brought to the compare station subsequent to reading. Belts B and C have been operated in a similar manner so that comparison may now take place within the computer. In the computer one of the three documents originally withdrawn from their respective magazines is selected as lowest and the belt holding the selected document is incremented one document position to carry the document to the transfer belt. The computer further selects the magazine D, E or F that is to receive the selected document for stacking. For purposes of description of the control circuits, assume that belt A is selected to feed its document to the transfer belt and belt F is to move the selected document to its magazine from the transfer belt. The selected document must then be moved by belt A to the transfer belt which is, in turn, actuated to carry the document downward two increments into alignment with belt F.

Referring to FIG. *5a*, six belt selection lines are provided from the computer of which four are shown, with each line being associated with one of the transport belts. Since three documents have been compared and the document on belt A found to be the one with the lowest value, the computer signals belt A via line 125–A to feed its document into a recess on the transfer belt. At a predetermined time after the "feed" signal, a "stack" signal is provided on one of the remaining computer lines, in this case 125–F, to designate that belt as the receiving belt for removing the document from the transfer belt. The signal on line 125–A appears at two AND circuits 126–A and 127–A. Each of the other input lines 125 provide signals to similar AND circuits 126 and 127 for the remaining belts. At this point it may be assumed that AND circuit 127–A is conditioned at its other input so that latch 129–A is turned on. The resulting signal appears on line 130 as an input to OR circuit 131 to provide a conditioning signal to AND circuit 132. The output from OR 131 also appears at AND 133 which may be assumed to be fully conditioned so that trigger 134 is turned on. The on signal fully conditions AND 132 to provide a Feed Busy signal at its output. The latter signal is returned to the computer to block the further selection of a feeding belt and also is applied to Inverter 135 to inhibit AND circuit 136.

The signal on line 130 is also applied to OR circuit 137 in FIG. *5d* and to AND circuit 138. The signal from OR 137 is of no effect since Direction trigger 117 is already on. However, the signal at AND 138–A is effective, if there are no document jams in the machine as may now be assumed, to provide a signal to OR 113–A to turn on Drive trigger 114–A. Belt A is thus moved another increment as described above for the starting operation. The signal from OR circuit 131 in FIG. *5a*, in addition to appearing at AND 133, also appears on line 139 to condition all AND circuits 126–A through 126–F, and appears at Inverter circuit 140. The output of the Inverter on line 144 is at the lower voltage level and serves to block all AND circuits 127–A through 127–F and render the sorting apparatus unresponsive temporarily to further feed signals from the computer. Returning to latch 129–A, the output signal also appears on line 154 in FIG. *5b* as the input signal to AND circuits 141, 142, and 143 in a Decoding circuit which determines the number of increments which the transfer belts will have to move. A second input to one of these AND circuits will be provided when the computer selects the transport belt which is to stack the selected document.

Following the feed signal on input line 125–A, the computer then determines which transport belt is to receive the document from the transfer belt, which at this point is line 125–F in accordance with the original assumption. A signal on this line appears at AND circuits 126–F and 127–F. The latter AND circuit, however, is blocked because of the absence of a signal on line 144 from Inverter 140. AND 126–F is operated to turn on latch 128–F so that a stack signal is supplied on line 145 from the latch and appears as an input to OR 146, producing an input to AND circuits 136 and 147. AND 136 is blocked by the absence of a signal from Inverter circuit 135. At this point neither AND circuits 136 nor 147 are fully conditioned to provide output signals. The output signal from OR 146 is also applied at Inverter 148 whose output is connected to AND circuits 126–A through 126–F via line 149 so that further stack signals cannot be received from the computer. The stack signal is also present on line 150 from latch 128–F and is applied as an input to AND circuits 142 and 151 in FIG. *5b*. In this figure, AND 142 is fully conditioned with two input signals, Feed A and Stack F, so that an output signal is provided from OR 152 on line 153. The output signal indicates that when the document has reached the transfer belt it will have to be moved downward two increments of distance; that is, from alignment with belt A to alignment with belt F. The transfer belt, however, is inoperative until the selected document has been moved thereto by belt A.

After belt A had been selected by the computer to move its document to a transfer belt, a feed signal was generated when trigger 114–A in FIG. *5d* was turned on. When belt A has moved sufficiently, sensor DS–A5 provides a signal in conjunction with the Forward signal from trigger 117 to thus turn off Drive trigger 114–A. This action turns on Brake trigger 120–A which subsequently is turned off by sensor DS–A6. During the operation of belt A another document is removed from the magazine and read into storage for subsequent comparison.

When belt A stops moving, a test is performed to detect document jams and block future belt movement if there is a jam present. This test is automatically performed when Brake trigger 120–A is turned off. The termination of a signal at Inverter 155 produces an output signal which turns on Single Shot 156 so that AND 157 is partially conditioned. The remaining input to the AND 157 circuit is from sensor DS–A2 which detects the presence of documents between the magazine and the read station. If a document is sensed then an output signal is generated from AND 157 effective through OR 158 to turn on Jam latch 159. The output signal from the latch is applied at Inverter 160 terminating its output signal so that no signal is present on line 161 thus blocking AND circuits 138–A through 138–F in FIG. *5d* and AND circuit 163 in FIG. *5c*. If no jam is detected by sensor DS–A2, the signal from Inverter 160 continues and operation of the machine remains unblocked. Similar circuits for each of the other belts are provided as inputs to OR circuit 158 so that if a jam occurs in any transport belt the machine will stop until the jam is corrected and latch 159 is reset by an operator.

When belt A completes its movement to deposit the selected document on the transfer belt, this terminates the feed operation by turning off trigger 134 in FIG. *5a*. As soon as sensor DS–A6 detects a reflective spot, its signal serves to fully condition AND circuit 165 so that an output signal is provided to turn off the trigger. The remaining sensor inputs for each of the transport belts are already present since none of the other belts were moved. The termination of the output signal from trigger 134 blocks the signal from AND 132 and the signal on line 166, the effect of which will become evident subsequently. With the removal of a signal from AND 132, Inverter 135 then provides an output signal to AND 136. This signal in conjunction with a stack signal present from OR 146 fully conditions AND 136 and turns on trigger 167. The trigger output fully conditions AND 147 to inform the computer that a transfer is in progress, provides a Transfer Operate signal to AND 163 (FIG. *5c*), and supplies a signal to Inverter 168. This causes the Inverter output to drop blocking AND 133 so that trigger 134 cannot be turned on. The Transfer Operate signal serves to initiate operation of the transfer belt to carry the selected document from present alignment with belt A into alignment with belt F or down two units.

The Transfer Operate signal is applied at AND circuit 163 in FIG. *5c* in conjunction with a Move Belt signal and a No Jam signal. The Move Belt signal is obtained from Inverter 170 in FIG. *5b* and is generated only in the event the transfer belt is to be moved one or two units. In the case where a document is to be moved from one horizontal belt to an opposite one in alignment, a signal will appear at OR circuit 171 from the transfer decoder and block any signal from Inverter 170. Returning now to FIG. *5c*, when all three input signals are present at AND 163, an output signal is generated which is applied to AND circuits 172 and 173. The remaining input required at AND 172 is the on output from the Move Two trigger 174. This trigger has already been turned on by a signal appearing on line 153 (FIG. *5b*) which is supplied to OR 175. It will be recalled that a signal on line 153 originated when the computer chose the A belt to feed and the F belt to stack a selected document. A signal on line 153 also is supplied to OR 176 to provide a Move Down signal on line 177 which will be required subsequently. The on output signal from trigger 174 (FIG. *5c*) fully conditions AND 172, and is applied to Inverter 178 so that AND circuits 179 and 180 are blocked for the time being. A signal from AND 172 turns on the Drive Two trigger 181 and the on output signal is applied through Delay 169 on line 182 to AND circuits 183 and 184. The delay of the drive signal permits evacuation of transfer belt chambers hereinafter described. AND 183 is thus fully conditioned because of the signal present on line 177 so that an output signal is provided therefrom through OR 185 to OR 186 to actuate lower electrostatic clutch 37 of the transfer belt (FIG. 2). This causes the transfer belt to start its downward movement at termination of the delay.

In the example, the document is to move down two units from alignment with belt A into alignment into belt F. Therefore, sensor DS–X3 and DS–X2 (FIGS. 7 and 8) must be rendered ineffective to brake and stop the transfer belt at the first of reflective spots 33 encountered. This is accomplished by using the signal from Inverter 178 (FIG. 5*c*) to block AND 179 so that the signal from DS–X3 is ineffective. However, when sensor DS–X2 senses the first reflective spot on the transfer belt, its signal will turn off trigger 174, removing the blocking condition at AND circuits 179 and 180. The control of trigger 174 by DS–X2 this renders DS–X3 ineffective until the next succeeding or second reflective spot is sensed by DS–X3 during the time AND 179 is not blocked. This AND circuit is also conditioned by the signal on line 153 so that an output is produced to turn off trigger 181. The off signal of trigger 181 is effective at OR circuit 187 to turn on Transfer Brake trigger 188. The resulting output signal appears on line 189 at AND circuits 190 and 191. Only AND 191 is conditioned by the signal on line 177 so that a brake pulse is transmitted through OR 192 to operate the upper drive clutch and slow the transfer belt. Brake trigger 188 is turned off by the signal from sensor DS–X2 which is generated at the second reflective spot after the movement of the transfer belt was initiated.

Figure 5A:
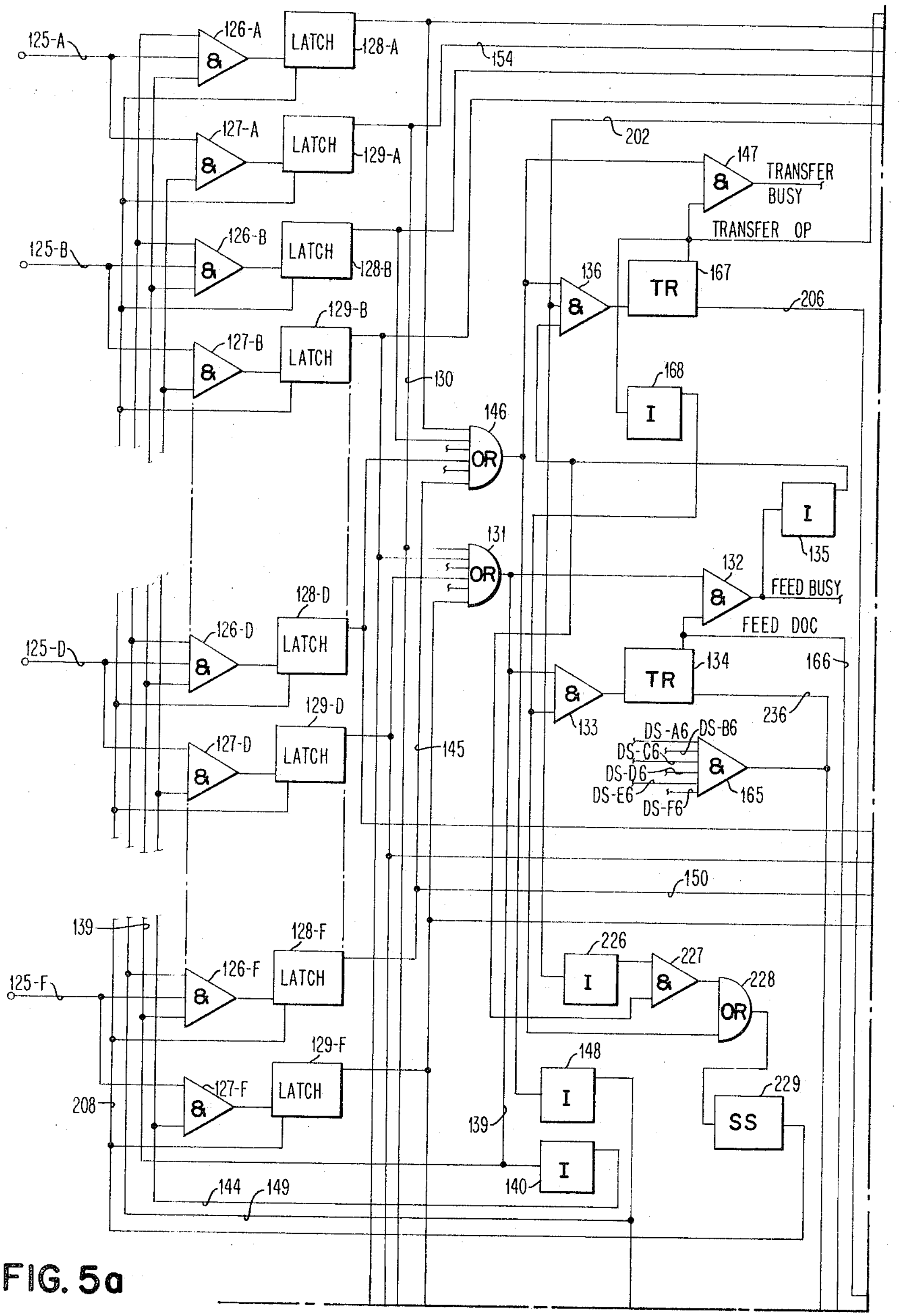
Figure 5B:
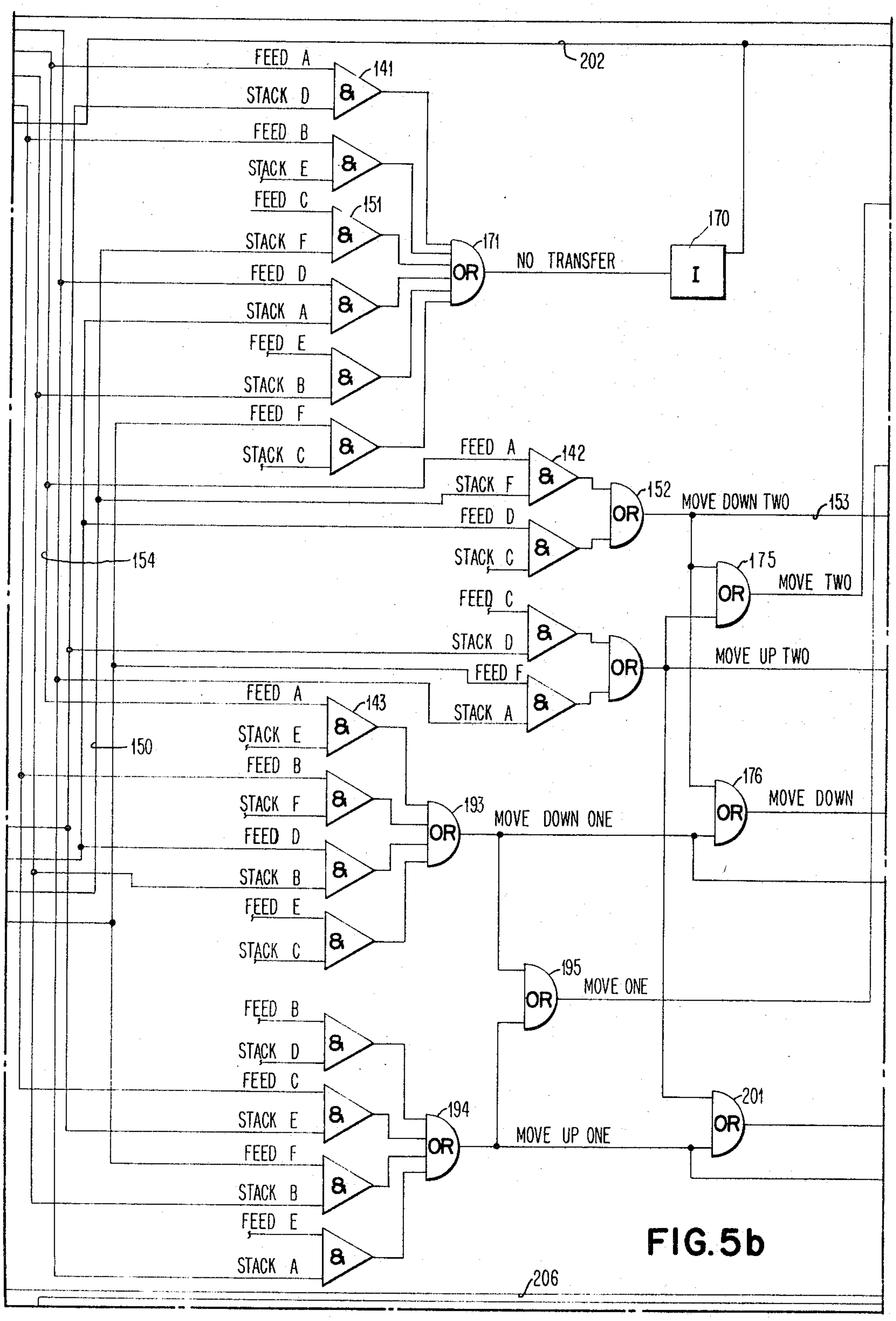

It may be noted with reference to FIG. 5*b*, that if the transfer belt is to be moved one unit either up or down, a signal occurs at either of OR circuits 193 or 194 transmitted through OR 195 to AND 173 which turns on Drive One trigger 196. AND 173 is conditioned by the off signal from trigger 174 and the Operate signal from AND 163. The on signal from trigger 196 is delayed at 203 and appears on line 197 at AND circuits 198 and 199. AND 198 is conditioned by the Move Down Signal on line 177 while AND 199 is conditioned by the Move Up signal on line 200 from OR 201. The presence of either Move Down or Move Up signals is dictated by the decoding network shown in FIG. 5*b*. In this figure each of the feed and stack signals of all possible combinations are combined to determine the amount and direction of movement required of the transfer belt.

Figure 5C:
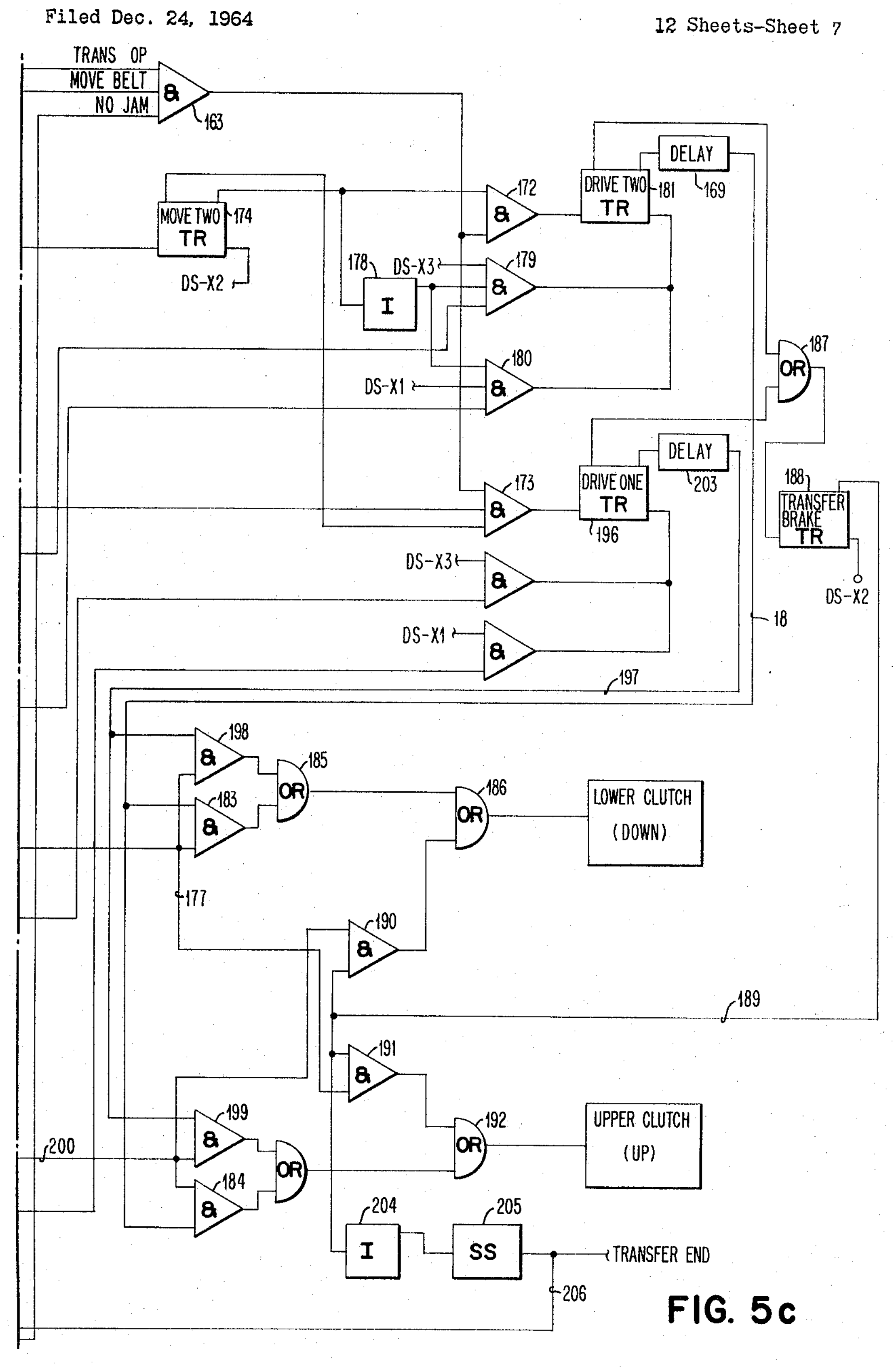

When a signal is supplied to OR 171 from any of the input AND circuits, indicating no transfer, the resulting output signal is applied to Inverter 170 which, in turn, blocks AND 163 in FIG. 5*c*. The signal from Inverter 170 also is applied on line 202 to block AND 136 (FIG. 5*a*) to prevent transfer trigger 167 from being turned on, and is applied to Inverter 226 whose output is connected to AND 227. The remaining input to AND 227 is from Inverter 135 which provides a signal when the Feed trigger 134 goes off. AND 227 is thus operative to produce a signal when the feed operation is complete and no document transfer is required. This signal is applied through OR 228 to turn on Single Shot 229 to generate a latch reset signal on line 208 for latches 128 and 129. This action prepares the sorter for new feed and stack selection signals from the computer without the necessity of a transfer operation.

A Transfer End signal is produced upon completion of any movement of the transfer belt by the signal produced from trigger 188 in FIG. 5*c*. A signal on line 189 is inverted at the output of Inverter 204, and when the signal therefrom terminates, Single Shot 205 is turned on and the output signal appears on line 206 to turn off trigger 167 (FIG. 5*a*). When trigger 167 is turned off, it blocks further operation of the transfer belt, removes the Transfer Busy signal from AND 147, and causes Inverter 168 to provide an output signal. The signal from Inverter 168 appears at AND 133 to partially condition that circuit and also appears at OR 228 to activate Single Shot 229. This signal from Single Shot 229 appears on line 208 to reset all latches 128 and 129. At this point the sorter operation circuits are ready to receive further selection signals from the computer on lines 125.

In the sorting example, the selected document is now sitting on the transfer belt, but in alignment with belt F which is to stack the document. The selected document has been moved by belt A to the transfer belt, and the transfer belt has been moved two units downward to the position opposite belt F. The movement so far concludes what may be termed one sorting cycle. The selected document will be removed from the transfer belt upon initiating a succeeding cycle.

Figure 5D:
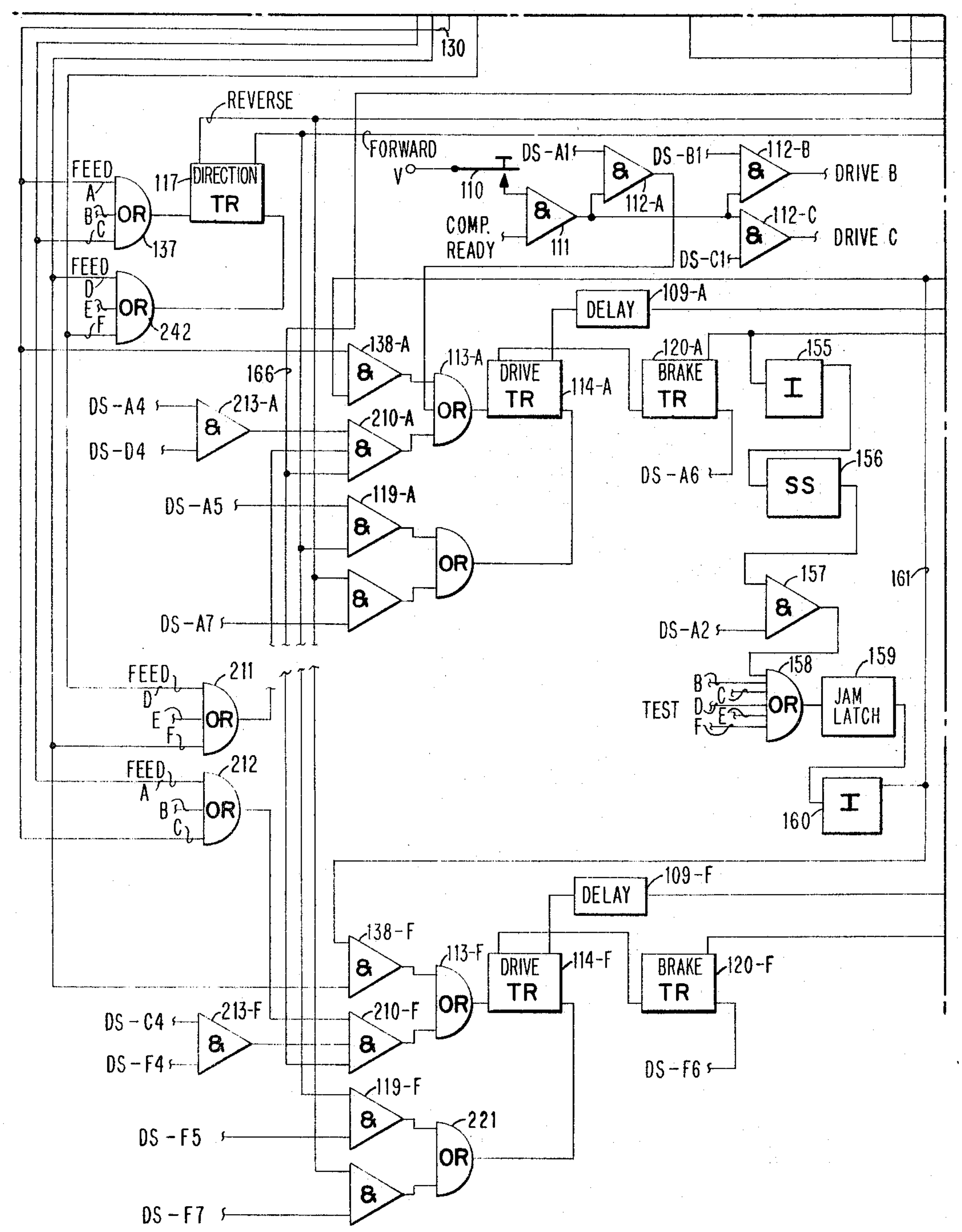
Figure 5E:
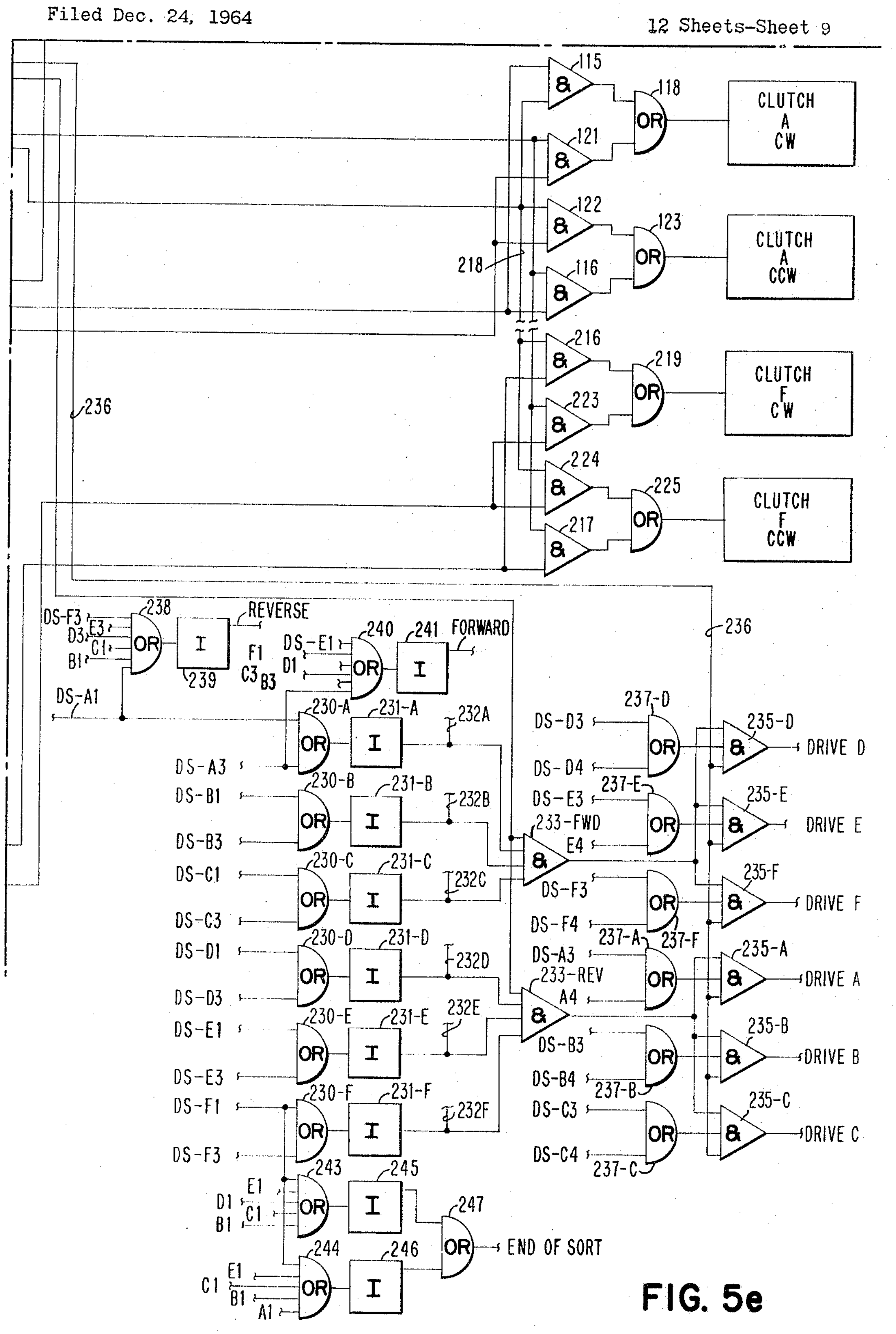

The next selection of a feed and stack belt made by the computer turns on trigger 134 (FIG. 5*a*), as explained heretofore. The resulting signal on line 166 appears as a conditioning input to all AND circuits 210–A through 210–F (FIG. 5*d*). Each of these AND circuits is further conditioned by a signal from OR circuits 211 or 212, one of which is activated each time a feed signal is generated by the computer inputs. OR circuit 211 provides an output signal any time that feeds D, E or F are selected and the output is supplied only to AND circuits 210–A, B or C. OR circuit 212 provides an output signal only when feeds A, B or C have been selected and the output signal is used to condition the remaining AND circuits 210–D, E or F. Thus, when documents are being sorted in the forward direction from left to right, a feed signal to OR circuit 212 and the direction signal partially condition AND circuit 210–F. The remaining input to be supplied to that AND circuit is from AND 213–F, currently conditioned by the signals from data from sensors DS–C4 and DS–F4. In FIG. 7 it will be seen that these document sensors detect opposite ends of a card on the transfer belt when located between belts C and F. The combined signals from these two data sensors indicate that a document is on the transfer belt and in alignment with belt F ready for removal. A feed signal is thus generated from AND 210–F (FIG. 5*d*) and transmitted through OR circuit 113–F turning on trigger 114–F which provides a drive signal to AND circuits 216 and 217 (FIG. 5*e*). Since the sorter is still in the forward mode, a signal is present on line 218 so that AND 216 is fully conditioned, supplying a signal through OR 219 to actuate the clockwise clutch of belt F. The actuation of this belt removes the first selected document from the transfer belt and carries it to the compare station just prior to the reading station.

The movement of belt F is terminated by the signal from sensor DS–F5 (FIG. 5*d*) in conjunction with the forward mode signal at AND circuit 119–F similar to that described for belt A above. The signal from AND 119–F is transmitted through OR 221 to turn off trigger 114–F. This action turns on Brake trigger 120–F so that a signal is applied to AND circuits 223 and 224 (FIG. 5*e*). AND 224 is conditioned by the forward signal so that a Brake signal is transmitted through OR 225 to the counterclockwise clutch for belt F to terminate movement thereof. Brake trigger 120–F is turned off by a signal from sensor DS–F6. The stacking operations of any one of the belts D through F having a document aligned therewith has the initiation of a feed cycle occur automatically and concurrently at the initiation of a feed operation of any one of the belts A through C while sorting in a forward or left to right direction. It will be seen that when the sorter is operating in the reverse direction feeding from right to left, the initiation of a feed cycle in belts D, E or F at OR circuit 211 (FIG. 5*d*) will condition feeds A, B or C to automatically stack any record document aligned therewith.

At this point the sorter has been started and three documents have been withdrawn from their respective magazines A, B or C and read and compared. The document having the lowest value was selected by the computer and the belt therefor activated. The document was placed on the transfer belt for vertical movement. A document was thereupon moved from a selected feed belt to the proper stacking belt at the conclusion of a first cycle of operation. The second cycle of operation comprised selecting a second card from belts A, B or C and repeating the operation. However, the first selected document was removed from the transfer belt by the selected stacking belt, while the second selected document was concurrently placed on the transfer belt. The operation of the sorter continues in this manner always selecting the lowest value document and building up a sequence of documents in the selected stacking magazine until a break in sequence occurs.

In the event that all documents compared have the same value the computer is programmed to select one belt and then another over the others to place all equal documents adjacent one another in the currently selected stacker. When the situation is encountered in which the lowest-valued document is lower than the last document placed in a stacking magazine, only the remaining feed belts are used for sorting. However, when all feeds hold documents lower than the last-stacked document, a break in sequence occurs. The computer is programmed to then select a new stacking magazine and initiate a new ascending sequence for documents beginning with the lowest valued document on the feed belts. Each new sequence is shifted to a new stacking magazine, so that at the conclusion of comparing all cards once, there may be several sequences in each of the three stacking magazines. At that point the machine is ready for reversal and the sorting continued in the opposite direction. With each reversal of direction, the number of sequences is reduced until finally all documents will be placed in a single magazine.

Stacker reversal is controlled by first determining that all supply magazines, such as A, B and C, are empty and that any documents in the process of being transported from the supply magazines to the stacking magazines have been carried to the stacking magazines. When these conditions have been determined, the computer is signaled and document feeding in the opposite direction takes place under control of the computer by the selection of the opposite plurality of magazine and belts, such as D, E and F. The empty condition of the supply magazines and belts is determined by checking document sensors DS–A1 and DS–A3 for belt A along with the same document sensors for belts B and C, and combining these signals for each belt in a respective OR circuit 230–A through 230–C as shown in FIG. 5*e*. The output from each OR circuit is inverted by Inverters 231–A, B and C, and a signal that the respective magazines are empty is provided to the computer on lines 232–A, B and C when there are no input signals to the OR circuits for each supply magazine and belt. The computer is programmed to avoid the further selection of a particular feed upon receipt of the "Empty" signal. The output of each of the lines 232 is also supplied to AND circuit 233 and combined with another input signal thereto from Inverter 148 (FIG. 5*a*) which is present when no stacking selection has been made. This combination of inputs at AND 233–*Fwd* provides an output to AND 235–D, E and F. The latter circuits provide an output signal to continue driving the stacking belts D, E and F after the selection of a feed and stacking belt is concluded. Thus the remaining inputs to each of the AND circuits 235–D, E and F are from document sensors 3 and 4 for each stacking belt such as DS–D3 and DS–D4, in combination with a signal on line 236 of AND circuit 165 in FIG. 5*a*. The signal on line 236 provides the necessary pulse signal to the output from AND circuit 235 which supplies drive signals to each of the stacking belts D, E and F as long as documents remain therein. It will be noted in FIG. 5*e* that a circuit similar to that just described is also provided for clearing the sorting apparatus when belts A, B and C are the stacking belts in the reverse mode of operation. The circuits include similarly numbered logic circuits but with different letters suffixed.

The circuits associated with AND circuits 235 cause the stack belts to continue operation until all documents have been deposited in the appropriate stacking magazine. When the documents have been stacked, this condition is sensed by OR circuit 238 to which the document sensors for the supply magazines provide three inputs and the remaining three inputs are provided by document sensors in the stack belts at the comparing stations. The output of OR 238 is supplied to Inverter 239 so that when there is no signal from the OR circuit, a Reverse or End of Pass output signal is provided from Inverter 239 to the computer, and the selection of all document-holding magazines in the second plurality occurs to obtain an initial comparison. The computer may be programmed to automatically and successively feed a document into the comparing station from each magazine holding a stack of documents. If desired, the Forward or Reverse signals may be used to control the initial feeding upon a change in sorting direction. The computer is now ready to select belts D, E and F as supply belts and belts A, B and C as stack belts upon receipt of the signal from Inverter 239. Similarly, OR circuit 240 and Inverter 241 are provided to supply a Forward or End of Pass signal to the computer when sorting has been completed in the reverse direction.

Referring to FIG. 5*d*, when belts D, E or F have been selected for feeding by the computer, a signal is generated from OR 242 to turn off Direction trigger 117 conditioning the drive and brake circuits of the respective feeds for the reverse mode of operation. Document sorting thus continues in first one direction and then the other until finally documents are arranged in a single sequence. When this occurs, the sorted documents will be either in magazine A or magazine D since it is assumed that the computer is programmed to select the upper magazine of each plurality to receive the first sequence of documents when sorting starts in either direction. The conclusion of sorting is determined by the signals from OR circuits 243 (FIG. 5*e*) and 244 and their respective Inverter circuits 245 and 246. The Inverter outputs are supplied to OR circuit 247, which, in turn, provides an End of Sort signal to the computer to stop all operation. OR circuit 243 is supplied with document sensor signals from all magazines except magazine A, and OR 244 is supplied with document sensor signals from all magazines except magazine D.

Figure 9A:
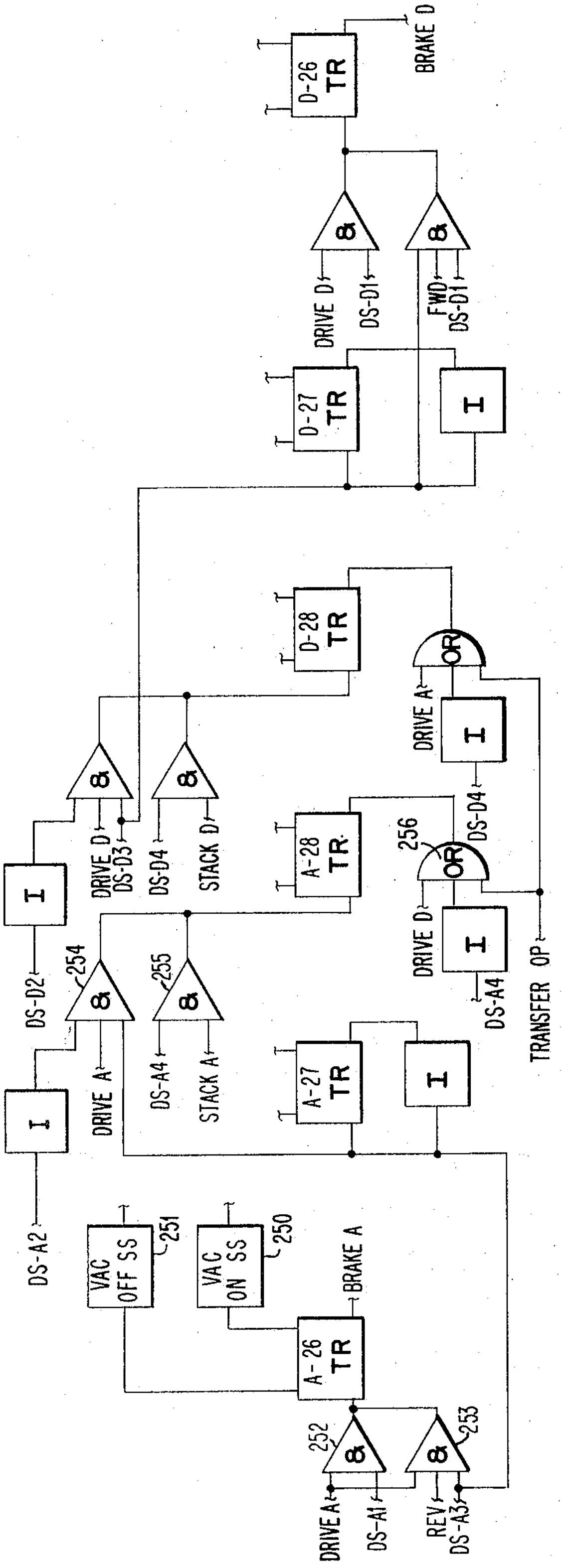
Figure 9B:
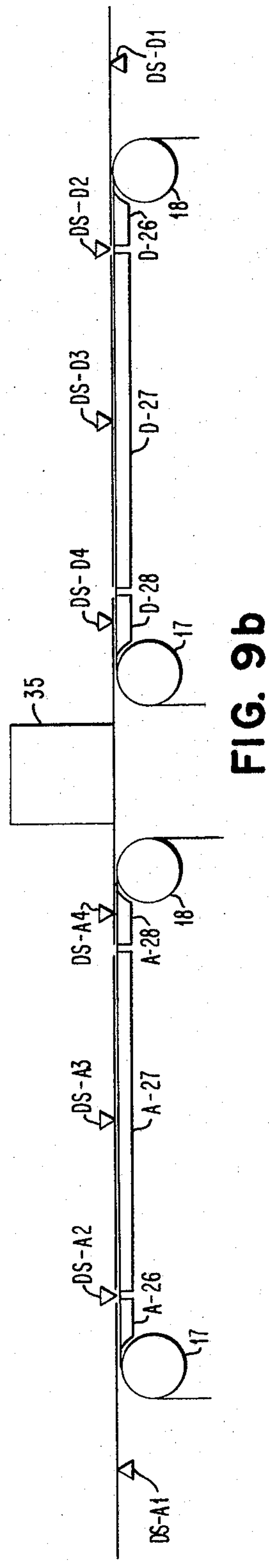

In the above description of FIGS. 1 and 2, it will be recalled that vacuum chambers 26, 27 and 28, for each horizontal transport belt, and chambers 43, 44 and 45, for the transfer belt, are to be controlled by the valving arrangement of FIG. 3. The valving is, in turn, controlled by the presence of documents at various locations in the machine. The circuit arrangement for chambers 26, 27 and 28 for each of the horizontal belts is shown in FIGS. 9*a* and 9*b*. The circuits in FIG. 9*a* for vacuum control are located above the corresponding chambers in FIG. 9*b*.

A trigger, such as A–26, 27 or 28, is provided for each chamber and the on or off outputs each provide a signal to the corresponding clutch rotor 66 (FIG. 3) or to a rotor 65 to respectively open or close a chamber to vacuum. The trigger output signal is used to directly operate the on Single Shot 250 or the off Single Shot 251 for each trigger so that resulting timed signals energize the clutch rotors through brushes 80. It will be recalled that each belt 67 (FIG. 3) has stops 84 fixed thereto which strike an abutment 85 so that the band moves a fixed distance, remaining until moved again by a signal to the opposite rotor. All vacuum chamber triggers operate their valve bands in an identical manner.

The operation of the trigger, however, is controlled by various signals in the circuits for belt motion. With belt A as an example and with all triggers initially off, trigger A–26 for chamber A–26 is turned on by document sensor DS–A1 in conjunction with a Drive A signal at AND 252 when the belt is feeding documents. The coincidence of DS–A3, Reverse and Drive A signals at AND 253 turn on the trigger when belt A is stacking documents. Because of the signal delay from trigger 114–A in FIG. *5d*, chamber A–26 has vacuum applied thereto prior to the time belt A starts to move. The vacuum is turned off for chamber A–26 by a Brake A signal which occurs just prior to the conclusion of belt motion. The dual control of the vacuum triggers is necessary since documents move in both directions through the sorter. As documents are moved from the magazine to the comparing station, chamber A–27 is evacuated and the trigger therefor is turned on by the leading edge of the document as it passes under sensor DS–A3. Vacuum remains on chamber A–27 until the trailing edge of the document passes beyond sensor DS–A3 which occurs at the next selection of belt A.

Chamber A–28 is operated by several signals because the chamber is controlled for the arrival and departure of documents via two horizontal belts and the vertical belt. If a forward direction be assumed, then trigger A–28 is turned on by a combination of a DS–A3 signal, a Drive A signal, and absence of a DS–A2 signal at AND 254. This indicates that belt A has been selected and a document is already present at the comparing station under sensor DS–A3. Documents arriving by the transfer belt initiate operation of the trigger by a DS–A4 signal and Stack A signal at AND 255. The evacuation for the chamber is terminated by a signal at OR circuit 256 which may be either a Drive D signal, absence of a DS–A4 signal, or Transfer Operate signal. The occurrence of the drive signal indicates that the document aligned with the chamber A–28 is to be moved directly onto belt D. The absent DS–A4 signal indicates that the document has been moved out of the position adjacent belt A and the occurrence of a Transfer Operate signal indicates that the document is to be moved by the transfer belt.

The chambers for belt D are controlled in a manner similar to that for belt A as shown in FIG. *9a*. The vacuum chambers are designated as mirror images of the chambers for belt A and the signals likewise are appropriately changed for corresponding triggers D–28, D–27 and D–26. Due to the similarity of control circuits for the transport belt vacuum chambers, no further description is considered necessary since the vacuum chambers for belts A and D are similar and controlled in like manner as those for belts B, C, E and F.

Figure 11:
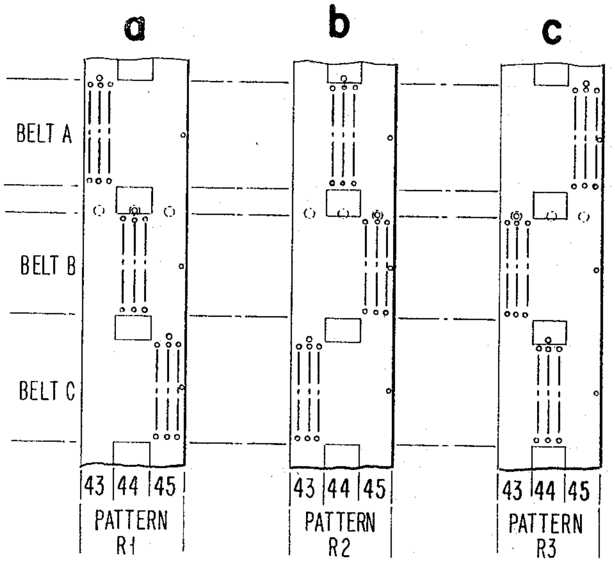

The control circuit, however, for the vacuum chambers underneath the transfer belt is somewhat different as shown in FIGS. 10 and 11. The transfer belt is provided with three parallel vacuum chambers 43, 44 and 45 each extending between clutches 36 and 37 (FIG. 2). These chambers are also selectively connected to vacuum prior to the movement of the transfer belt. The three possible arrangements of perforations in transfer belt 35 which communicate with the vacuum chambers underneath are shown in FIG. 11. Since any one of the six horizontal belts may be activated to carry a document to the transfer belt, the arrangement of perforations must necessarily be sensed before one of the vacuum chambers is evacuated so that vacuum may be maintained in back of the document as it moves from alignment with the feed belt to alignment with the stacking belt which can be one or two units of movement. A perforation pattern is provided to conserve vacuum and yet permit a document to be moved the required one or two units. Thus, if belt B is to be activated with a Feed signal when the perforations of the belt are oriented as in Pattern R–2, then chamber 43 must be evacuated for the required movement up or down. It will be noted that these chambers are to be evacuated only in the event that the document must be moved vertically.

The decoding circuit for properly evacuating the required chamber is shown in FIG. 10 wherein each vacuum chamber has a corresponding control trigger 43, 44 and 45. The outputs, both on and off, for each trigger are each connected to a Single Shot similar to that shown in FIG. *9a*. The trigger to be turned on is, of course, determined by the perforation pattern present at that time in the transfer belt. This pattern is detected by three photosensors PS–50, 51 and 52. Sensor PS–51 provides an output signal when the perforation pattern corresponds to R–1; sensor PS–52 provides an output signal when the pattern corresponds to R–2; and sensor PS–50 provides a signal when the pattern corresponds to R–3. The sensor signals are combined at AND circuits 260 for each of the possible combinations that may be encountered during a feed operation. For example, AND circuit 260–B will provide an output signal when a feed B signal and photosensor PS–50 coincide. The output signal is applied to OR circuit 261 to condition AND circuit 262. Upon receipt of a Transfer Operate signal on line 264 from trigger 167 in FIG. *5a*, AND 262 becomes energized to turn on trigger V–43 so that Single Shot 263 is turned on to apply vacuum to chamber 43. Vacuum is applied to the chamber until the receipt of a terminating signal from Single Shot 205 in FIG. *5c* indicating the transfer is at an end. The Transfer End signal appears on line 265 to turn off any activated trigger. When trigger V–43 goes off, its output turns on Single Shot 266 to raise chamber 43 to atmospheric pressure. In a similar manner, triggers V–44 and V–45, each controlling their respective vacuum chambers, are also turned on by any one of the possible combinations that may be encountered with the generation of a feed signal and the position of the transfer belt at the conclusion of a transfer operation. Thus, trigger V–44 will be turned on when any AND circuit 267–A through F provides an output signal, and trigger V–45 is turned on when any AND circuit 268–A through F generates an output signal concurrently with a signal on the Transver Operate line 264 at respective AND circuits 269 and 270. This circuit permits selective evacuation with a minimum of pump capacity.

In the foregoing description, not all of the reset circuits have been indicated in order to simplify the drawings. The provision of such circuits, to assure that triggers and latches are in the required state at the start of operation, is considered to be within the ability of persons skilled in the art of circuit design and thus not necessary in this description.

It will be apparent from the above description that the operating sequence of the sorting apparatus may be changed by altering the program of the attached computer. For example, the sorting activity may be limited to less than the full number of magazines in either plurality. Furthermore, by minor changes in the circuits, selected transport belts in a plurality can be controlled to operate in either direction during a pass to provide additional stacking or feeding magazines. The number of magazines and transport belts therefor may, of course, be increased in either plurality to obtain comparison of a larger number of documents.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus of the class described comprising:

a plurality of magazines each adapted to hold a stack of documents therein;

reversible document transport means adjacent each of said magazines being operable in one direction to remove a document from its said magazine and operable in an opposite direction to enter a document thereinto;

document transfer means associated with each of said transport means and operable to move a document from one to another of said transport means;

operating means connected to each of said transport means for simultaneously operating one of said transport means in said one direction and another of said transport means in said opposite direction; and
control means connected with said transfer means and said operating means for operating said transfer means for a predetermined time after said transport means have concluded operation.

2. Apparatus of the class described, comprising:
a plurality of magazines each adapted to hold a stack of documents therein;
reversible transport means adjacent each said magazine and operable in one direction for removing documents from a said magazine and operable in an opposite direction for depositing documents in said magazine;
transfer means common to all of said transport means for receiving a document from one said transport means and delivering a document to another said transport means in accordance with the direction of said transport means; and
control means for simultaneously operating one of said transport means in said one direction and another said transport means in said opposite direction and then operating said transfer means at the conclusion of operation of said transport means whereby a said document is moved out of one of said magazines, another document is moved into another of said magazines, and a third document is moved from one transport means to another.

3. Sorting apparatus comprising, in combination:
a plurality of magazines, each adapted to hold a stack of documents therein;
a plurality of reversible transport means, each being adjacent one of said magazines and operable in a first direction for removing a document from its said magazine to a transfer position, and operable in a second direction for moving a document from said transfer position into said magazine, said transport means being arranged to move a said document in parallel paths in a common plane;
a transfer means adjacent said transport means for receiving a said document at one said transfer position and carrying a document to another said transfer position, said transfer means being arranged to move a document in a direction transverse to that of said paths and in said common plane;
means for energizing said transport and transfer means for movement in selected directions; and
sequence control means for said energizing means to operate a selected transport means in said first direction to move a selected document thereby, then operate said transfer means to move said selected document transversely from one said transfer position to another, and then operate a second of said transport means in a second direction to carry said selected document from said transfer means.

4. Apparatus of the class described comprising:
a plurality of magazines each adapted to hold a stack of documents therein;
a plurality of reversible transport means, each adjacent one of said magazines being operable in one direction for removing documents successively from its magazine and operable in another direction for depositing documents successively in its said magazine, each said transport means including a rotatable, endless, flexible member having a document receiving surface thereon with said members being arranged to carry documents in substantially a common plane;
a reversible document transfer means common to said transport means in said plurality and having a rotatable, endless, flexible member with a document receiving surface thereon for carrying a document in said common plane from one said transport means to another; and
control means for selectively rotating a pair of said transport members and said transfer member to move a document from one of said magazines to another.

5. Apparatus as described in claim 4 wherein:
each of said flexbile member and said belt are perforated in preselected areas; and
said transport and transfer means further include vacuum chambers adjacent said members and said belt for effecting attraction of a document thereto.

6. Apparatus as described in claim 4 wherein:
each of said flexible member and said belt are perforated in preselected areas;
said transport and transfer means further include vacuum chambers adjacent said members and said belt for effecting attraction of a document thereto; and
said control means includes means for evacuating selected ones of said chambers.

7. Sorting apparatus comprising, in combination:
a plurality of magazines each adapted to hold a stack of documents therein;
a plurality of transport means, each adjacent one of said magazines and operable in a first direction for removing a document from its said magazine to a transfer position for said magazine and operable in a second direction for carrying a document from its said transfer position into its said magazine;
a reversible transfer means operable for moving a document from one said transfer position to another;
first operating means connected to said transport means for operating one said transport means in said first direction and a second said transport means in said second direction;
second operating means for moving said transfer means from one said transfer position to another; and
control means responsive to the conclusion of operation of said first operating means for initiating operation of said second operating means.

8. Apparatus as described in claim 7 further comprising circuit means for rendering said control means inoperable at predetermined times after a document has been removed to said transfer position.

9. Apparatus of the class described comprising:
a plurality of groups of magazines with each said magazine adapted to hold a stack of documents therein;
a corresponding group of reversible transport means for each said group of magazines with each transport means in a group adjacent one of said magazines in a group and operable in one direction for removing documents from the adjacent magazine and operable in another direction for depositing documents therein;
document transfer means associated with all of said groups of transport means and operable for carrying a document from a transport means in one group to a transport means in another group; and
control means for operating a selected transport means in each said group in opposite directions for moving a document to said transfer means and removing another document therefrom and subsequently operating said transfer means at the conclusion of operation of said transport means.

10. Apparatus as described in claim 9 wherein said transfer means carries a document thereon in a direction transverse to the direction of movement of a document in said transport means.

11. Apparatus as described in claim 9 wherein said transport and transfer means are arranged to move a document in substantially a common plane.

12. In sorting apparatus, the combination comprising:
a plurality of magazines each adapted to hold a stack of documents therein;
a reversible transport member adjacent each said magazine being operable in a first direction for withdrawing documents therefrom and operable in a second direction for depositing documents therein, said member having perforate, document-carrying portions therein;

a series of chambers adjacent each said member;

vacuum means connected to said chambers for evacuating said chambers to attract a document to said member adjacent thereto;

means for imparting increments of motion to selected ones of said members for movement relative to said chambers; and means under control of said incrementing means for selectively operating said vacuum means at said chambers in succession in accordance with the advance of a document thereon.

13. In sorting apparatus, the combination comprising:

a plurality of magazines each adapted to hold a stack of documents therein;

a reversible transport member adjacent each said magazine being operable in a first direction for withdrawing documents therefrom and operable in a second direction for depositing documents therein, said member having perforate, document-carrying portions therein;

a transfer member common to all said transport members and operable to move a document from one of said transport members to another;

a series of chambers adjacent each said transport member;

a vacuum means connected to said chambers for evacuating said chamebrs to attract a document to the said member adjacent thereto;

document detection means adjacent said transport members for detecting the presence of documents thereon;

means for imparting increments of motion to said transport and said transfer members for moving a document from one said magazine to another; and means under control of said incrementing means and said detection means for selectively operating said vacuum means to evacuate said chambers only when a document is adjacent to said transport members.

14. In sorting apparatus, the combination comprising:

first and second pluralities of magazines, each said magazine being adapted to hold a stack of documents therein;

corresponding first and second pluralities of reversible transport means for said groups of magazines with each transport means in a group being adjacent one of said magazines in said group, and each said transport means being operable in one direction for removing a document from said adjacent magazine and operable in another direction for depositing documents therein;

transfer means adjacent all said transport means operable for receiving a selected document from a transport means in one group and carrying said selected document to a transport means in another group, said transfer means including a movable, endless, flexible member having perforate document-receiving portions therein aligned with said transport means;

selectively operable vacuum means for attracting a document to said member during movement thereof, said vacuum means having a chamber parallel with a segment of said member and adjacent a said portion during transfer of a document thereby;

first control means for selectively operating a transport means in said first plurality in said one direction to select a document for transfer to a transport means in said second plurality; and second control means responsive to said first control means for operating said vacuum means and said transfer means to carry said selected document from said operated transport means to a transport means in said second plurality.

15. Apparatus as described in claim 14 wherein:

said vacuum means includes a plurality of parallel chambers;

said document-receiving portions of said members are each partially perforated so that the evacuation of a said chamber is effective at only selected ones of said portions; and said second control means includes circuit means to evacuate a predetermined one of said chambers coincident with the one of said portions holding said selected document.

References Cited by the Examiner

UNITED STATES PATENTS 2,989,181 6/1961 Dickinson ---------- 271—9 X
3,178,179 4/1965 MacLean ------------ 271—74

References Cited by the Applicant

UNITED STATES PATENTS 3,019,896 2/1962 Young.
3,028,958 4/1962 Pouliart et al.

M. HENSON WOOD, Jr., *Primary Examiner.*

R. A. SCHACHER, *Assistant Examiner.*